(12) United States Patent
Ochi

(10) Patent No.: US 9,470,000 B1
(45) Date of Patent: Oct. 18, 2016

(54) EXTERIOR STRUCTURE

(71) Applicant: NICHIHA CORPORATION, Nagoya-shi, Aichi (JP)

(72) Inventor: Yoshio Ochi, Nagoya (JP)

(73) Assignee: NICHIHA CORPORATION, Nagoya-Shi (JP)

( * ) Notice: Subject to any disclaimer, the term of this patent is extended or adjusted under 35 U.S.C. 154(b) by 0 days.

(21) Appl. No.: 14/869,261

(22) Filed: Sep. 29, 2015

(30) Foreign Application Priority Data

Sep. 15, 2015 (JP) ................... 2015-182159

(51) Int. Cl.
*E04B 2/30* (2006.01)
*E04F 13/08* (2006.01)
*E04B 1/41* (2006.01)

(52) U.S. Cl.
CPC ....... *E04F 13/0826* (2013.01); *E04F 13/0876* (2013.01); *E04B 1/41* (2013.01); *E04F 13/0805* (2013.01); *E04F 13/0841* (2013.01); *E04F 13/0875* (2013.01); *E04F 13/0889* (2013.01); *Y10T 403/7094* (2015.01)

(58) Field of Classification Search
CPC ............ E04F 13/0875; E04F 13/0889; E04F 13/0841; E04F 13/0805; E04F 13/0826; E04B 1/41; Y10T 403/7094
USPC .......... 52/489.1, 483.1, 474, 506.06, 506.09, 52/509, 235, 520, 506.05, 547, 715, 543, 52/802.1, 802.11; 403/381, 382
See application file for complete search history.

(56) References Cited

U.S. PATENT DOCUMENTS

| | | | |
|---|---|---|---|
| 6,460,311 B1 * | 10/2002 | Ito | E04F 13/0826 52/489.1 |
| 6,499,261 B2 | 12/2002 | Hikai | |
| 6,615,560 B2 | 9/2003 | Ito | |
| 6,843,032 B2 * | 1/2005 | Hikai | E04F 13/0846 52/287.1 |
| 7,665,260 B2 | 2/2010 | Hikai | |
| 8,667,763 B2 | 3/2014 | Hatzinikolas | |
| 8,979,052 B2 * | 3/2015 | Uota | E04F 13/0846 248/226.11 |
| 2002/0046546 A1 * | 4/2002 | Ito | E04F 13/0846 52/802.11 |
| 2010/0325997 A1 | 12/2010 | Scully et al. | |
| 2011/0173902 A1 * | 7/2011 | Hohmann, Jr. | E04B 1/7616 52/167.1 |
| 2015/0096251 A1 | 4/2015 | McCandless et al. | |

FOREIGN PATENT DOCUMENTS

| | | |
|---|---|---|
| JP | 10-183942 A | 7/1998 |
| JP | 2000-213140 A | 8/2000 |
| JP | 2001-355325 A | 12/2001 |

* cited by examiner

*Primary Examiner* — Chi Q Nguyen
(74) *Attorney, Agent, or Firm* — Birch, Stewart, Kolasch & Birch, LLP

(57) ABSTRACT

An exterior structure includes a front-side lateral joint portion and a back-side lateral joint portion disposed at horizontal edge portions of each facade board, a front-side vertical joint portion and a back-side vertical joint portion disposed at a lower edge portion and an upper edge portion of each facade board, a lateral joint formed between horizontally adjacent facade boards as a result of superposing the front-side lateral joint portion of one facade board and the back-side lateral joint portion of the other facade board one on the other, and a vertical joint formed between vertically adjacent facade boards as a result of superposing the front-side vertical joint portion of one facade board and the back-side vertical joint portion of the other facade board one on the other. In at least four horizontally and vertically adjacent facade boards, the lateral joints form a joint area substantially linearly continuous in the vertical direction.

7 Claims, 25 Drawing Sheets

EXTERIOR STRUCTURE

CROSS REFERENCES TO RELATED APPLICATIONS

This application is based on Japanese Patent Application No. 2015-182159 filed in the Japanese Patent Office on Sep. 15, 2015, the entire contents of which are hereby incorporated by reference.

BACKGROUND OF THE INVENTION

1. Field of the Invention

The present invention relates to an exterior structure of a building.

2. Description of the Related Art

U.S. Pat. No. 8,667,763, U.S. Patent Application Publication No. 2010/0325997, and U.S. Patent Application Publication No. 2015/0096251 disclose exterior structures. Each of these exterior structures includes a building structure, an insulating member, multiple support elements, and multiple quadrilateral facade boards. The building structure is built of, for example, reinforced concrete or brick and forms an exterior wall of a building. The insulating member and the support elements are disposed on the exterior side of the building structure. The facade boards are located on the exterior side of the building structure, further outwardly than the insulating member and the support elements. The facade boards are attached to the support elements so as to be adjacent to one another in the horizontal and vertical directions. Each facade board covers the building structure, the insulating member, and the corresponding support element to decorate the exterior wall. Each facade board has flat end faces, orthogonal to a front surface and a back surface of the facade board, at vertical and lateral edges forming four sides of the facade board.

SUMMARY OF THE INVENTION

In each of the disclosed exterior structures, end faces of adjacent facade boards simply abut against each other and a gap is left between the adjacent facade boards. With respect to this point, the exterior structures disclosed in U.S. Pat. No. 8,667,763 and U.S. Patent Application Publication No. 2010/0325997 include a ventilation gap between the insulating member and each facade board. The exterior structure disclosed in U.S. Patent Application Publication No. 2015/0096251, on the other hand, includes a vertically extending passageway located behind a gap between horizontally adjacent facade boards.

In each of the disclosed exterior structures, however, rainwater enters through the gap between adjacent facade boards and permeates the insulating member, whereby the insulating member may be degraded. To address this situation, the exterior structures disclosed in U.S. Pat. No. 8,667,763 and U.S. Patent Application Publication No. 2010/0325997 need to take prevention measures against arrival of rainwater at the insulating member, such as widening of the ventilation gap or laying of a waterproof sheet over the surface of the insulating member. The exterior structure disclosed in U.S. Patent Application Publication No. 2015/0096251, on the other hand, is capable of hindering rainwater from arriving at the insulating member by causing rainwater that has entered through the gap between horizontally adjacent facade boards to run down through the passageway so that the rainwater is discharged downward. However, the structure of such a passageway is likely to become complex.

In each of the disclosed exterior structures, part of the building structure, the insulating member, and the support elements may be exposed through the gap between adjacent facade boards, whereby the external appearance of the exterior wall is likely to be degraded.

The invention is made in view of the existing situations and aims to provide an exterior structure capable of suppressing degradation of an insulating member due to rainwater and degradation of the external appearance of an exterior wall with a simple structure.

In order to achieve the above object, an exterior structure according to an aspect of the invention includes a building structure having an exterior wall of a building; an insulating member disposed on an exterior side of the building structure; a plurality of support elements disposed on the exterior side of the building structure; a plurality of quadrilateral facade boards disposed on the exterior side of the building structure, further outwardly than the insulating member and the support elements, and attached to the support elements so as to be adjacent to one another in a horizontal direction and a vertical direction, the facade boards covering the building structure, the insulating member, and the support elements; a front-side lateral joint portion disposed at a horizontal edge portion of each facade board, the front-side lateral joint portion being set back from a back surface of the facade board toward a front surface of the facade board and extending in the vertical direction; a back-side lateral joint portion disposed at another horizontal edge portion of each facade board, the back-side lateral joint portion being set back from the front surface of the facade board toward the back surface of the facade board and extending in the vertical direction; a front-side vertical joint portion disposed at a lower edge portion of each facade board, the front-side vertical joint portion being set back from the back surface of the facade board toward the front surface of the facade board and extending in the horizontal direction; a back-side vertical joint portion disposed at an upper edge portion of each facade board, the back-side vertical joint portion being set back from the front surface of the facade board toward the back surface of the facade board and extending in the horizontal direction; a lateral joint formed between each horizontally adjacent pair of the facade boards as a result of the front-side lateral joint portion of one of the adjacent facade boards and the back-side lateral joint portion of the other one of the adjacent facade boards being superposed one on the other; and a vertical joint formed between each vertically adjacent pair of the facade boards as a result of the front-side vertical joint portion of one of the adjacent facade boards and the back-side vertical joint portion of the other one of the adjacent facade boards being superposed one on the other. In at least four horizontally and vertically adjacent facade boards, the lateral joints form a joint area substantially linearly continuous in the vertical direction.

The exterior structure according to an aspect of the invention is capable of suppressing degradation of an insulating member due to rainwater and degradation of the external appearance of an exterior wall with a simple structure.

DESCRIPTION OF THE PREFERRED EMBODIMENTS

Figure 1:
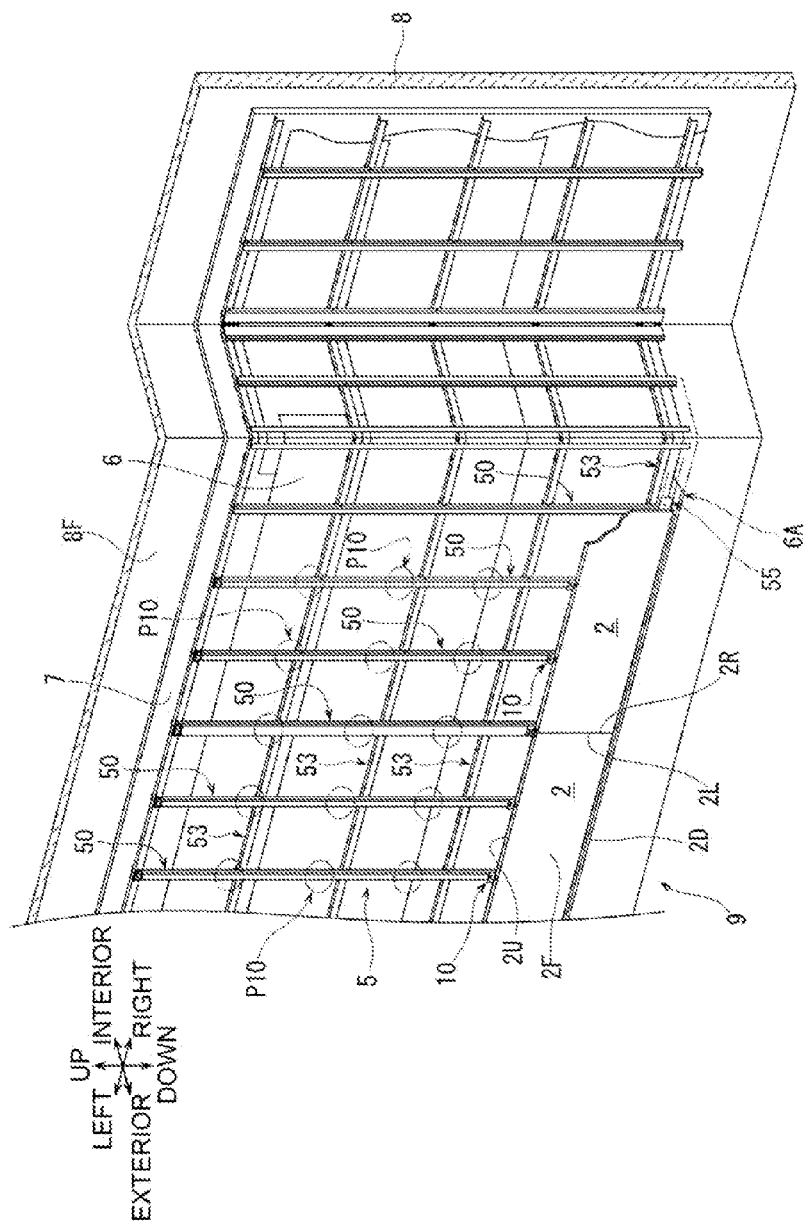
FIG. 1 is a perspective view of an exterior structure according to a first embodiment.

An exterior structure according to a first aspect of the invention includes a building structure having an exterior wall of a building; an insulating member disposed on an exterior side of the building structure; a plurality of support elements disposed on the exterior side of the building structure; a plurality of quadrilateral facade boards disposed on the exterior side of the building structure, further outwardly than the insulating member and the support elements, and attached to the support elements so as to be adjacent to one another in a horizontal direction and a vertical direction, the facade boards covering the building structure, the insulating member, and the support elements; a front-side lateral joint portion disposed at a horizontal edge portion of each facade board, the front-side lateral joint portion being set back from a back surface of the facade board toward a front surface of the facade board and extending in the vertical direction; a back-side lateral joint portion disposed at another horizontal edge portion of each facade board, the back-side lateral joint portion being set back from the front surface of the facade board toward the back surface of the facade board and extending in the vertical direction; a front-side vertical joint portion disposed at a lower edge portion of each facade board, the front-side vertical joint portion being set back from the back surface of the facade board toward the front surface of the facade board and extending in the horizontal direction; a back-side vertical joint portion disposed at an upper edge portion of each facade board, the back-side vertical joint portion being set back from the front surface of the facade board toward the back surface of the facade board and extending in the horizontal direction; a lateral joint formed between each horizontally adjacent pair of the facade boards as a result of the front-side lateral joint portion of one of the adjacent facade boards and the back-side lateral joint portion of the other one of the adjacent facade boards being superposed one on the other; and a vertical joint formed between each vertically adjacent pair of the facade boards as a result of the front-side vertical joint portion of one of the adjacent facade boards and the back-side vertical joint portion of the other one of the adjacent facade boards being superposed one on the other. In at least four horizontally and vertically adjacent facade boards, the lateral joints form a joint area substantially linearly continuous in the vertical direction.

In the exterior structure according to the first aspect, each facade board is a so-called "four-side shiplap structure" board including a front-side lateral joint portion, a back-side lateral joint portion, a front-side vertical joint portion, and a back-side vertical joint portion. The lateral joint is formed by superposing the front-side lateral joint portion of one facade board and the back-side lateral joint portion of another facade board one on the other. The vertical joint is formed by superposing the front-side vertical joint portion of one facade board and the back-side vertical joint portion of another facade board one on the other. Therefore, a gap formed between adjacent facade boards can be prevented.

In this exterior structure, the front-side lateral joint portion of one facade board and the back-side lateral joint portion of another facade board are superposed one on the other. The front-side vertical joint portion of one facade board and the back-side vertical joint portion of another facade board are superposed one on the other. This exterior structure thus is capable of preventing rainwater from accessing the back surfaces of the facade boards, so that rainwater is prevented from arriving at the insulating member.

In this exterior structure, in at least four horizontally and vertically adjacent facade boards, the lateral joints form joint areas that are substantially linearly continuous in the vertical direction. Thus, rainwater that is to access the back surfaces of the facade boards through the lateral joints is discharged downward along the joint areas. Rainwater is thus hindered from arriving at the insulating member and prevented from permeating into the facade boards. This exterior structure thus enables an adjustment of the ventilation gap between the insulating member and the facade boards to an intended size.

The exterior structure according to the first aspect of the invention is thus capable of suppressing degradation of an insulating member due to rainwater and suppressing degradation of the external appearance of an exterior wall with a simple structure. In this exterior structure, the ventilation gap between the insulating member and the facade boards is adjustable to an intended size, whereby the structure of the building is prevented from being unnecessarily increased in size. Furthermore, this exterior structure can dispense with laying of a waterproof sheet over the surface of the insulating member.

As a second aspect of the invention, preferably, the exterior structure further includes a securing member disposed on at least one of the support elements, the securing member supporting the vertical joint between the facade boards while being covered with the facade boards. In this case, the facade boards are allowed to be reliably attached to the support elements using the securing members. In this exterior structure, the securing members are not exposed through the front surfaces of the facade boards, whereby degradation of the external appearance of an exterior wall can be suppressed.

As a third aspect of the invention, preferably, in the exterior structure, the securing member includes a first locking portion, disposed on a first horizontal side of the joint area while being spaced apart from the joint area, and a second locking portion, disposed on a second horizontal side while being spaced apart from the joint area. The first locking portion supports the vertical joint between the facade boards disposed on the first horizontal side of the joint area. The second locking portion supports the vertical joint between the facade boards disposed on the second horizontal side of the joint area.

In this case, the first locking portion and the second locking portion of each securing member do not cross over the joint areas. Thus, in this exterior structure, in the case where rainwater is to access the back surfaces of the facade boards through the lateral joints, rainwater is discharged downward along the joint areas without the downward flow of the rainwater being stopped by the securing members or without stagnating at the securing members. Thus, rainwater is hindered from arriving at the insulating member and prevented from permeating into the facade boards.

As a fourth aspect of the invention, preferably, in the exterior structure, the support element includes a vertical support element disposed so as to face the back surfaces of the facade boards and so as to vertically extend along the joint area.

In this case, rainwater that is to access the back surfaces of the facade boards through the lateral joints is stopped by the vertical support elements located behind the joint areas and prevented from permeating into the insulating member. The rainwater is discharged downward along the vertical support elements besides the joint areas. Thus, rainwater is hindered from arriving at the insulating member and prevented from permeating into the facade boards.

As a fifth aspect of the invention, preferably, in the exterior structure, the vertical support element includes a vertically extending first protrusion and a vertically extending second protrusion. The first protrusion is disposed on a first horizontal side of the joint area while being spaced apart from the joint area and protrudes toward the facade boards. The second protrusion is disposed on a second horizontal side of the joint area while being spaced apart from the joint area and protrudes toward the facade boards.

In this case, rainwater running along the vertical support elements is guided downward while being prevented from flowing sideways by the first protrusion and the second protrusion, whereby the rainwater is hindered from arriving at the insulating member. Rainwater is also prevented from permeating into the facade boards.

As a sixth aspect of the invention, preferably, in the exterior structure, a vertical dimension of the vertical joint is greater than a horizontal dimension of the lateral joint.

In this case, the exterior structure is capable of preventing rainwater from accessing the back surfaces of the facade boards through the vertical joints, whereby rainwater is hindered from arriving at the insulating member and prevented from permeating into the facade boards.

As a seventh aspect of the invention, preferably, in the exterior structure, the facade board is made of a ceramic material containing cement. The support element is made of metal. In this case, in the exterior structure, the facade board is made of an alkaline ceramic material, whereby corrosion of the support elements is prevented even though the support element is made of metal.

Referring now to the drawings, first to fourth embodiments in which the invention is embodied are described. In FIG. 1, the vertically upward direction is denoted by UP, the vertically downward direction is denoted by DOWN, the exterior direction of the building is denoted by EXTERIOR, and the interior direction of the building is denoted by INTERIOR. In FIG. 1, the horizontally leftward direction when a wall surface 8F is viewed from the exterior side is denoted by LEFT and the horizontally rightward direction when the wall surface 8F is viewed from the exterior side is denoted by RIGHT. The directions in FIG. 2 and the subsequent drawings are represented in correspondence with those in FIG. 1.

First Embodiment

As illustrated in FIG. 1, an exterior structure according to the first embodiment is an example of an exterior structure of the invention. This exterior structure is provided to improve properties such as the external appearance and waterproof properties by externally decorating an exterior wall 9 of a building such as a house, an institution, or a warehouse.

As illustrated in FIG. 1 to FIG. 11, this exterior structure includes a building structure 8, an insulating member 7, a waterproof sheet 6, multiple support elements 5, multiple securing members 10, and multiple facade boards 2.

As illustrated in FIG. 1, FIG. 6, FIG. 7, and FIG. 10, the building structure 8 according to this embodiment is a solid body built of materials such as reinforced concrete or brick. Here, the building structure 8 can be built of, for example, a steel frame or wood. The building structure 8 forms the exterior wall 9 of the building and separates the outside from the inside. The wall surface 8F of the building structure 8 facing toward the exterior is a substantially flat surface extending in the horizontal and vertical directions. As illustrated in FIG. 1, the wall surface 8F is bent so as to follow the outer shape of the building.

As illustrated in FIG. 1, FIG. 6, FIG. 7, and FIG. 10, the insulating member 7 is disposed on the exterior side of the building structure 8 so as to cover the wall surface 8F from the exterior side. The insulating member 7 is formed of Rockwool in this embodiment. Here, the insulating member 7 may be formed of other materials including a fiber insulating material such as glass wool or a foam insulating material such as polyurethane hard foam.

Figure 7:
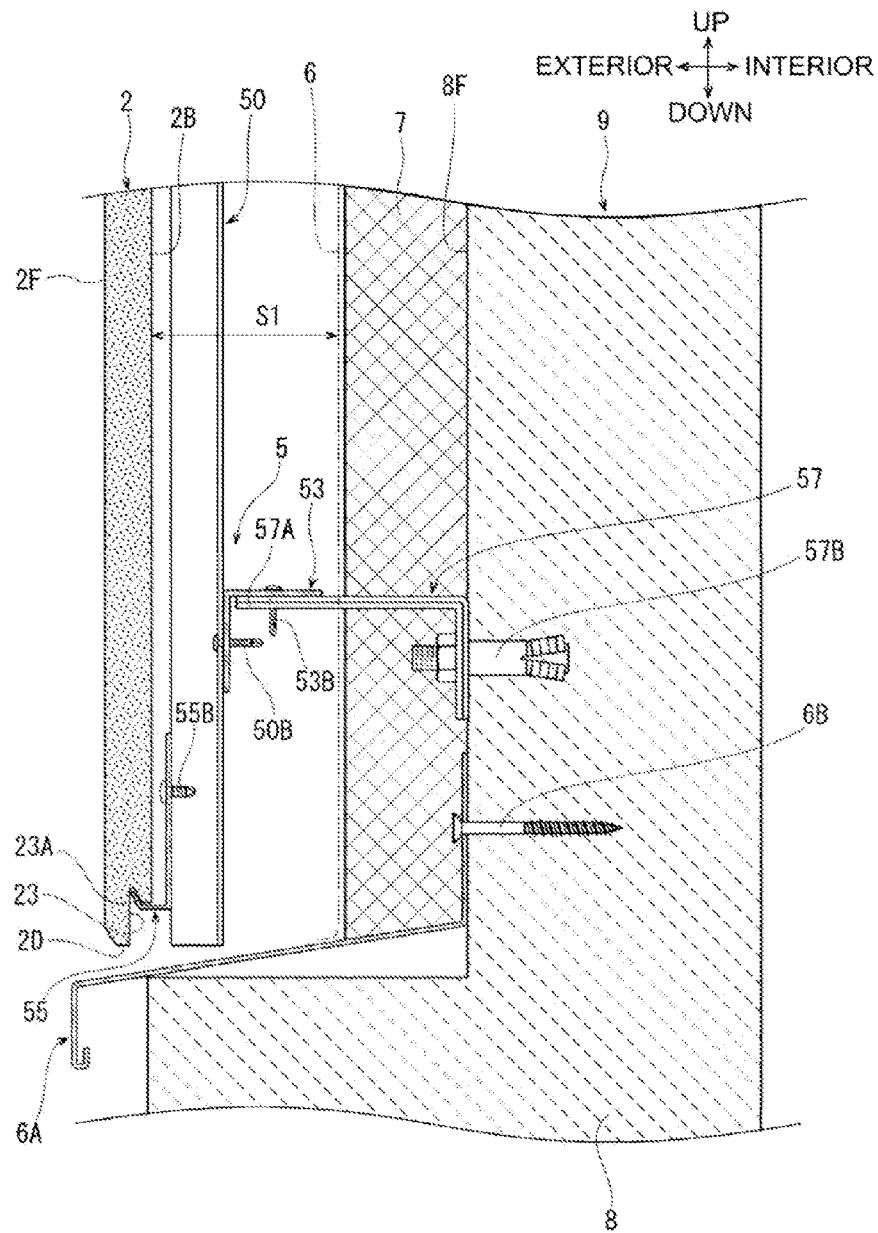
FIG. 7 is a partial cross-sectional view of the attachment structure taken along the line VII-VII of FIG. 6.
Figure 10:
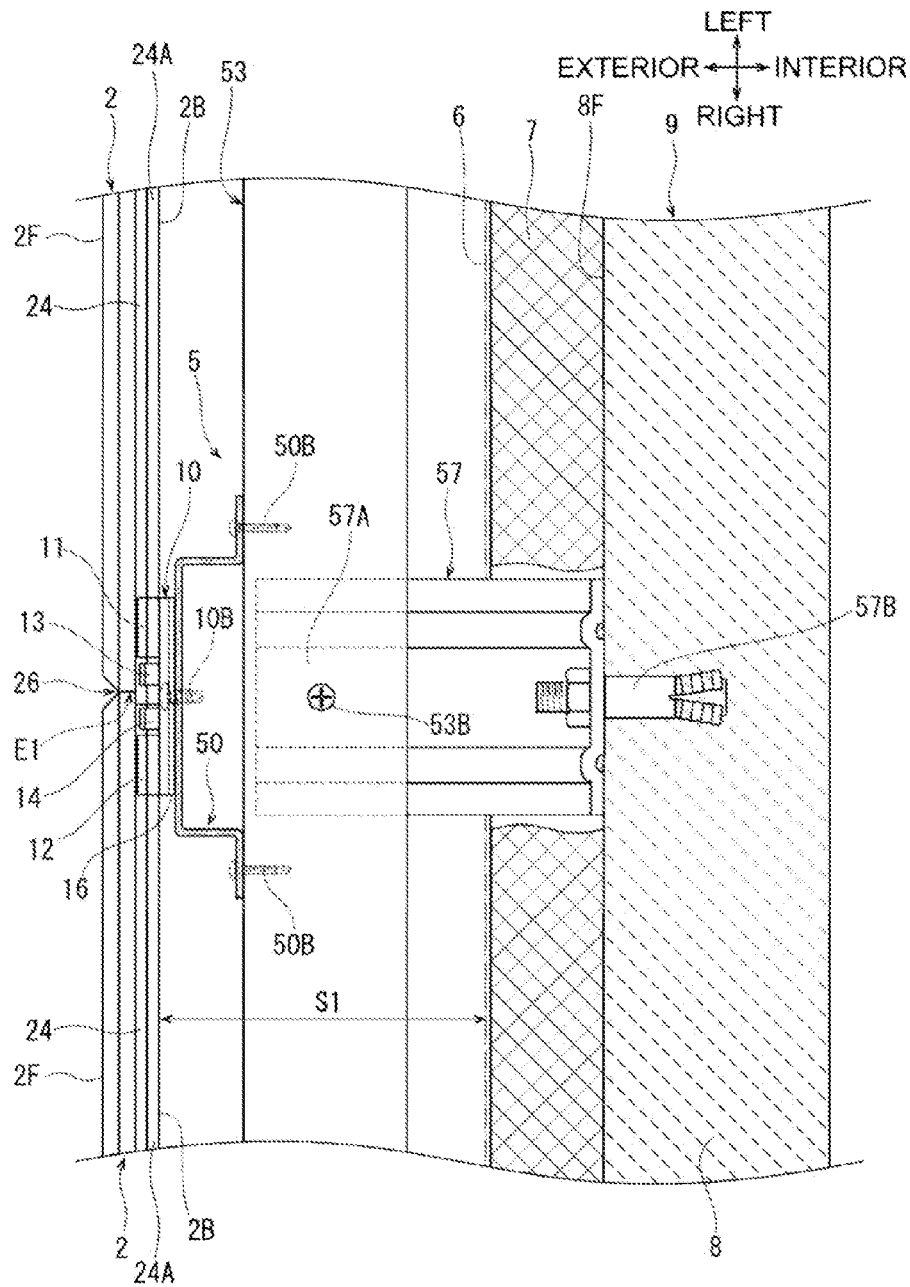
FIG. 10 is a partial cross-sectional view of the attachment structure taken along the line X-X of FIG. 9.

As illustrated in FIG. 1, FIG. 7, and FIG. 10, the waterproof sheet 6 is laid over the surface of the insulating member 7 so as to cover the insulating member 7 from the exterior side. In this embodiment, the waterproof sheet 6 is a film sheet. The waterproof sheet 6 may be other sheets such as a nonwoven sheet or a sheet having moisture permeability besides waterproofness. The waterproof sheet is not indispensable to the exterior structure according to the invention. The waterproof sheet 6 according to the embodiment may be omitted.

Figure 6:
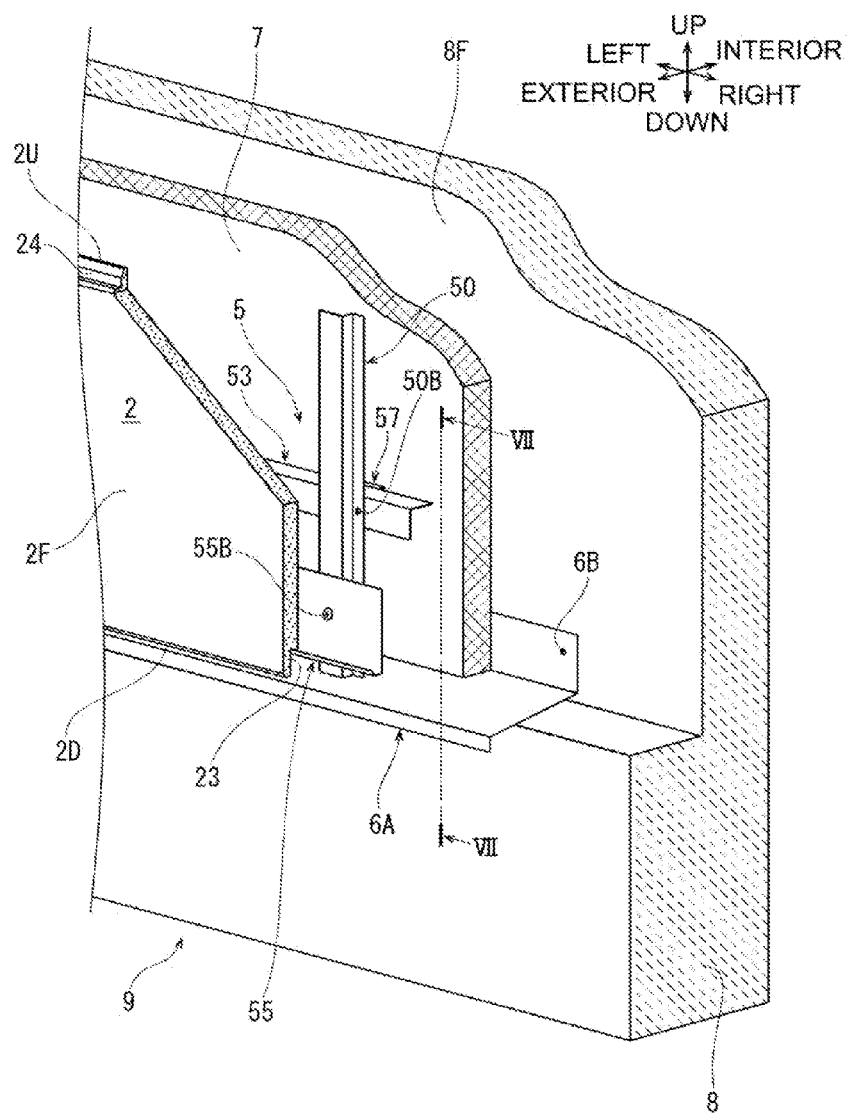
FIG. 6 is a partial perspective view of an attachment structure at lowermost facade boards according to the first embodiment.

As illustrated in FIG. 1, FIG. 6, and FIG. 7, a draining board 6A for draining out water that has flowed from the above is fixed to a lower end portion of the wall surface 8F using setscrews 6B. The setscrews 6B are an example of a fastener for fixing the draining board 6A to the wall surface 8F. Instead of the setscrews 6B, other devices such as rivets or nails may be used. The draining board 6A is formed by bending a laterally long board. The draining board 6A is bent at a position below the setscrews 6B so as to be directed obliquely downward toward the exterior and bent again so as to extend downward.

Although FIG. 1 and FIG. 6 omit an illustration of the right part of the draining board 6A, the draining board 6A actually extends rightward along the wall surface 8F.

As illustrated in FIG. 1, FIG. 6, FIG. 7, FIG. 9 and FIG. 10, the support elements 5 are appropriately selected from elements made of various types of materials having different properties such as shapes, sizes, or dimensions. In this embodiment, the support elements 5 are made of metal such as aluminum or iron. The material of the support elements 5 is not limited to metal and can be appropriately selected from materials including wood and resin materials such as rigid plastic or fiber reinforced plastic. In this embodiment, the support elements 5 include brackets 57, lateral support elements 53, vertical support elements 50, and a lower-edge support element 55. The brackets 57, the lateral support elements 53, the vertical support elements 50, and the lower-edge support element 55 are formed by subjecting, for example, aluminum extrusion to cutting into a predetermined length or a steel plate to blanking or bending.

Although FIG. 1 and FIG. 6 omit the illustration of the right part of the lateral support elements 53 and the lower-edge support element 55, the lateral support elements 53 and the lower-edge support element 55 actually extend rightward along the wall surface 8F. Although FIG. 6 omits the illustration of the upper part of the vertical support elements 50, the vertical support elements 50 actually extend upward along the wall surface 8F.

As illustrated in FIG. 6 and FIG. 10, each of the brackets 57 is formed by bending a board into a shape having a substantially L-shaped cross section. The multiple brackets 57 are fixed at respective portions to the wall surface 8F by anchor bolts 57B. After the insulating member 7 and the waterproof sheet 6 are laid over the wall surface 8F, a top portion 57A of each bracket 57 protrudes toward the exterior through the insulating member 7 and the waterproof sheet 6. The anchor bolts 57B are an example of a fastener for fixing the brackets 57 to the wall surface 8F. Instead of the anchor bolts 57B, devices such as setscrews or nails may be used.

As illustrated in FIG. 1, FIG. 6, FIG. 7, FIG. 9, and FIG. 10, each lateral support element 53 is a laterally long member having an L-shaped cross section. The multiple lateral support elements 53 are disposed on the exterior side of the building structure 8, further outwardly than the insulating member 7 and the waterproof sheet 6, so as to be vertically spaced apart from one another at predetermined intervals. As illustrated in FIG. 7 and FIG. 10, each lateral support element 53 is fixed, with setscrews 53B, to the top portions 57A of the multiple brackets 57 vertically positioned at the same height. The setscrews 53B are an example of a fastener for fixing the lateral support elements 53 to the top portions 57A of the brackets 57. Instead of the setscrews 53B, devices such as rivets, bolts, or nuts may be used.

Figure 9:
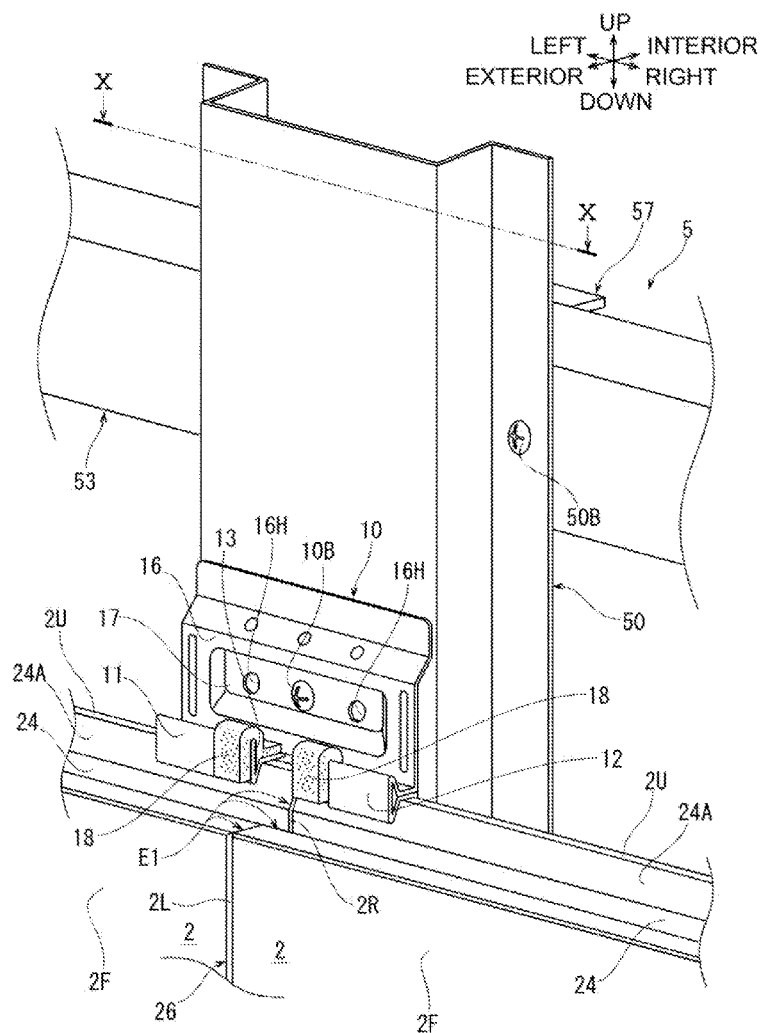
FIG. 9 is a partial perspective view of a facade-board attachment structure using a securing member according to the first embodiment.

As illustrated in FIG. 1, FIG. 6, FIG. 7, FIG. 9, and FIG. 10, each vertical support element 50 is a vertically long hat-shaped member. The multiple vertical support elements 50 are disposed on the exterior side of the building structure 8, further outwardly than the insulating member 7 and the waterproof sheet 6, so as to be laterally spaced apart from one another at predetermined intervals. As illustrated in FIG. 7, FIG. 9, and FIG. 10, each vertical support element 50 is fixed, with setscrews 50B, to the multiple lateral support elements 53. The setscrews 50B are an example of a fastener for fixing the vertical support elements 50 to the lateral support elements 53. Instead of the setscrews 50B, devices such as rivets, bolts, or nuts may be used.

As illustrated in FIG. 1, FIG. 6, and FIG. 7, the lower-edge support element 55 is formed by bending a laterally long board into a shape having a substantially J-shaped cross section. The lower-edge support element 55 is fixed to lower end portions of the multiple vertical support elements 50 with setscrews 55B. The setscrews 55B are an example of a fastener for fixing the lower-edge support element 55 to the vertical support elements 50. Instead of the setscrews 55B, devices such as rivets, bolts, or nuts may be used. The lower end portion of the lower-edge support element 55 is bent toward the exterior and then extends upward.

Specifically, the lateral support elements 53, the vertical support elements 50, and the lower-edge support element 55 are disposed on the exterior side of the building structure 8, further outwardly than the insulating member 7 and the waterproof sheet 6, and are assembled together in gridlike fashion.

Figure 8:
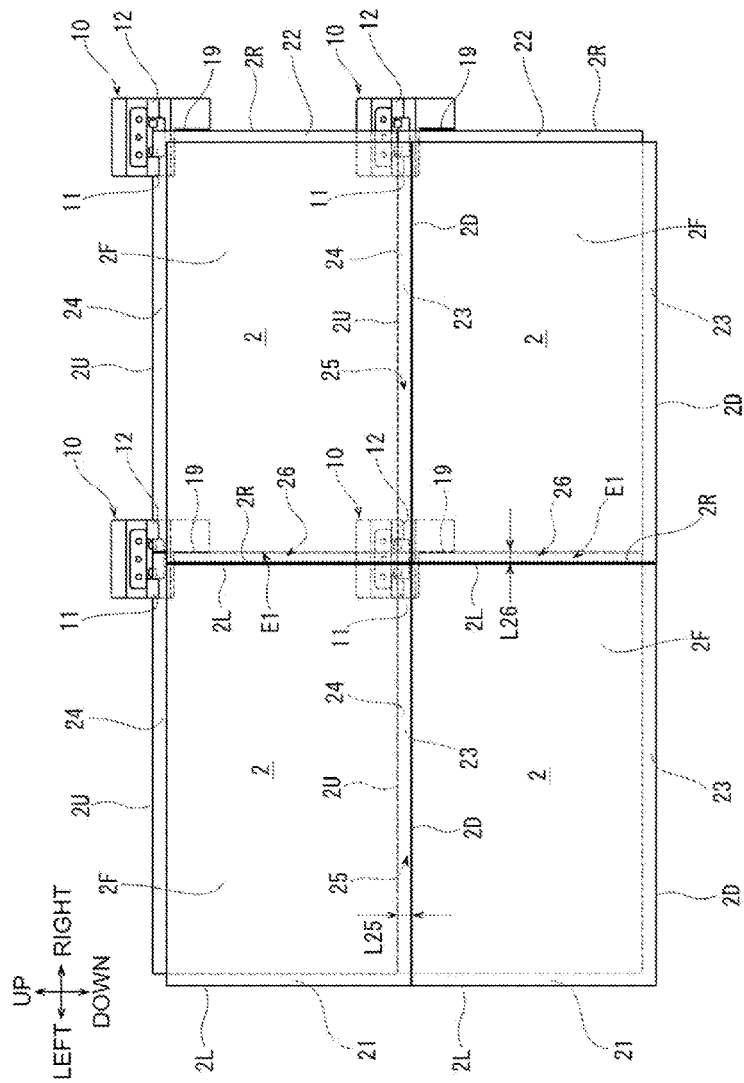
FIG. 8 is a front view of the relative positional relation between four facade boards and a securing member according to the first embodiment.
Figure 11:
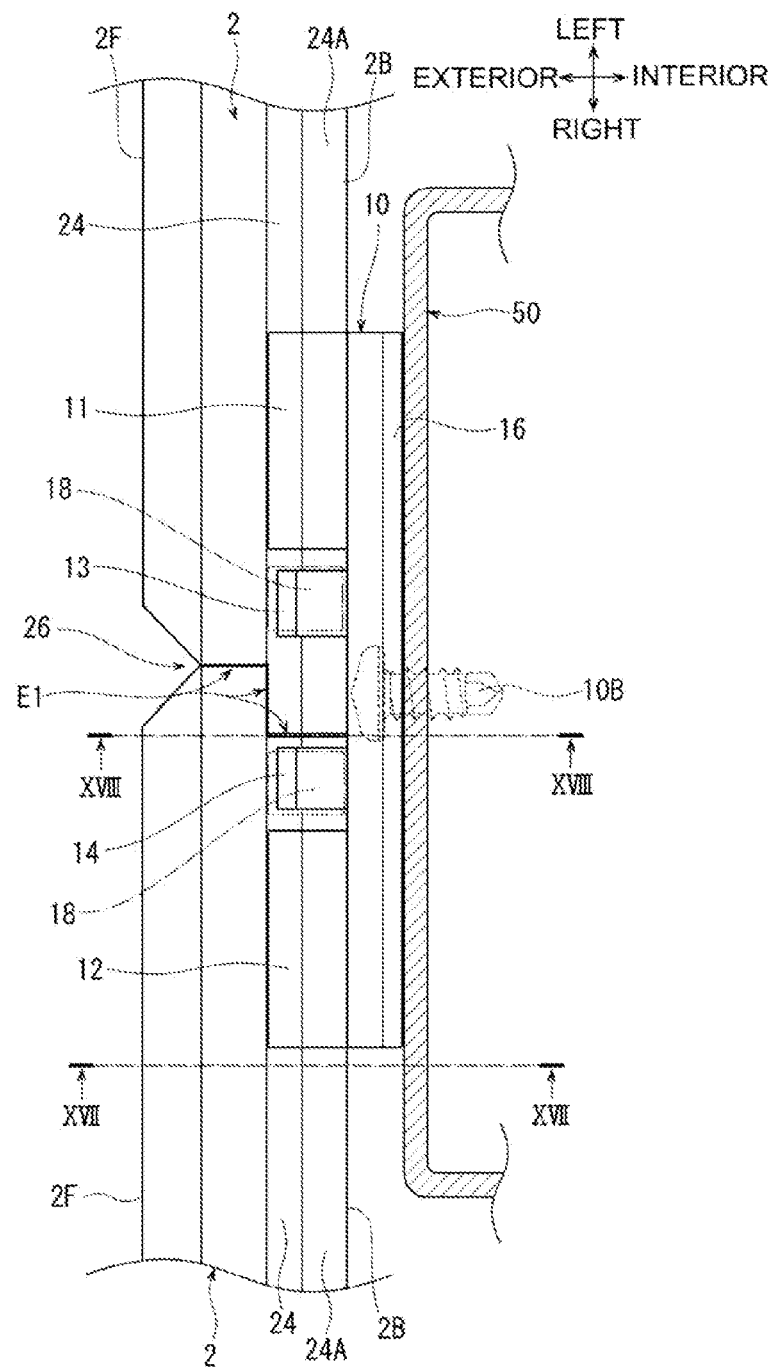
FIG. 11 is a partial cross-sectional view of an enlarged main portion of the attachment structure of FIG. 10.

As illustrated in FIG. 1, in this embodiment, multiple securing members 10 are provided to each of the multiple vertical support elements 50. When multiple facade boards 2 are to be attached to each of the vertical support elements 50, the securing members 10 are fixed to respective portions of each vertical support element 50 corresponding to the facade boards 2. Thus, in FIG. 1, the securing members 10 fixed at the positions corresponding to two lowermost facade boards 2 are drawn with solid lines. On the other hand, positions P10 at which the securing members 10 corresponding to multiple unattached facade boards 2 are to be fixed to the vertical support elements 50 are encircled with chain double-dashed lines. As illustrated in FIG. 1 and FIG. 8, the securing members 10 are fixed while being laterally and vertically spaced apart from one another at predetermined intervals. As illustrated in FIG. 9 to FIG. 11, the securing members 10 are fixed at predetermined portions of the vertical support elements 50 with setscrews 10B. The setscrews 10B are an example of a fastener for fixing the securing members 10 to the vertical support elements 50. Instead of the setscrews 10B, devices such as rivets, bolts, or nuts may be used.

The support elements 5 may exclude, for example, the vertical support elements 50 and instead include multiple securing members 10 disposed at portions of each lateral support element 53. Alternatively, the support elements 5 may exclude the vertical support elements 50 and the lateral support elements 53 and instead include securing members 10 at the top portions 57A of the multiple brackets 57.

Here, a specific configuration of each securing member 10 is described referring to FIG. 12 to FIG. 16. In the description below, the position of the securing member 10 in which the securing member 10 is fixed to the corresponding vertical support element 50 is used as a reference.

In this embodiment, each securing member 10 is formed by subjecting a board made of a material such as iron or stainless steel to blanking or bending. The material of the securing members 10 and the method for manufacturing the securing members 10 are not limited to those described above and can be appropriately selected from various types of materials or various other manufacturing methods.

Each securing member 10 includes a base portion 16, a lateral-displacement stopper portion 19, a first locking portion 11, a second locking portion 12, a first sealant-holding portion 13, and a second sealant-holding portion 14.

Figure 12:
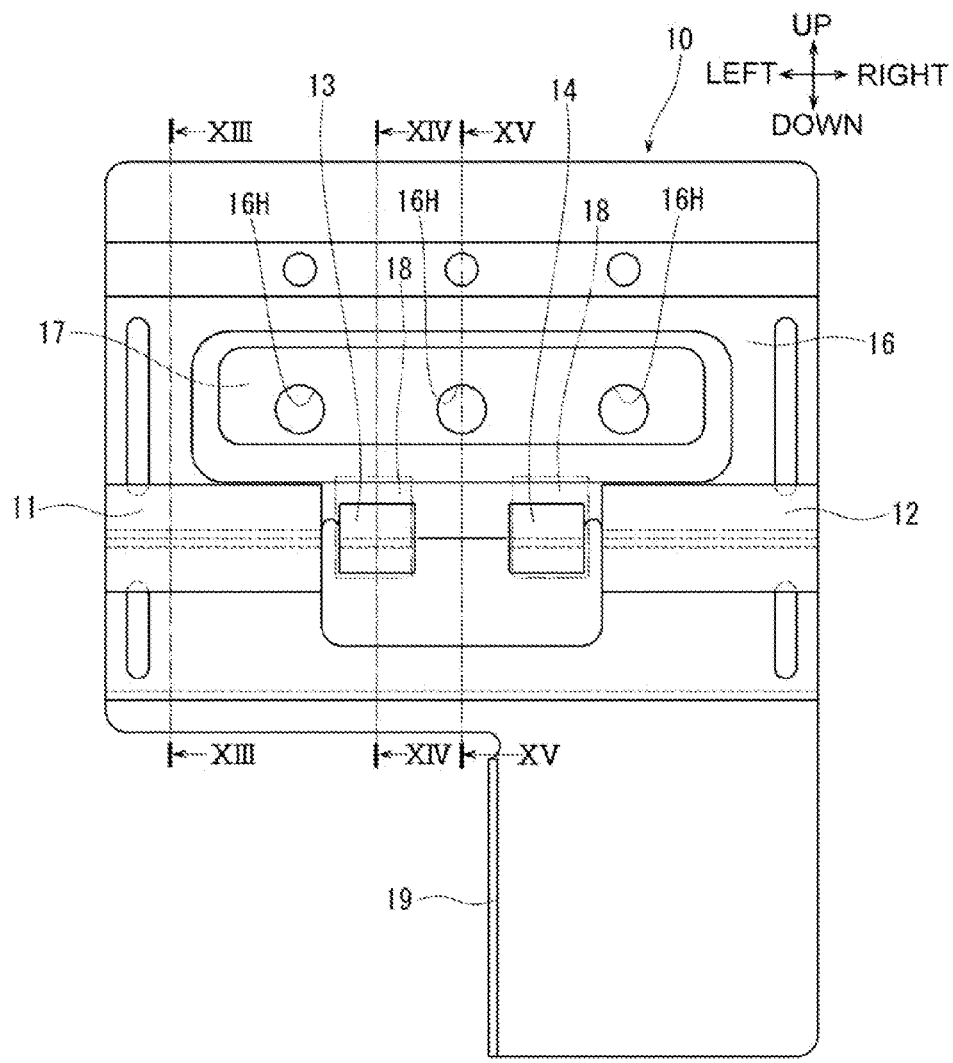
FIG. 12 is a front view of a securing member according to the first embodiment.

As illustrated in FIG. 12, the base portion 16 is substantially rectangular when viewed from the front. As illustrated in FIG. 13 to FIG. 16, the upper end portion of the base portion 16 is bent so as to extend obliquely upward toward the interior and then bent again so as to extend vertically upward. The lower end portion of the base portion 16 is bent so as to extend substantially horizontally toward the interior and then bent again so as to extend vertically downward.

Figure 16:
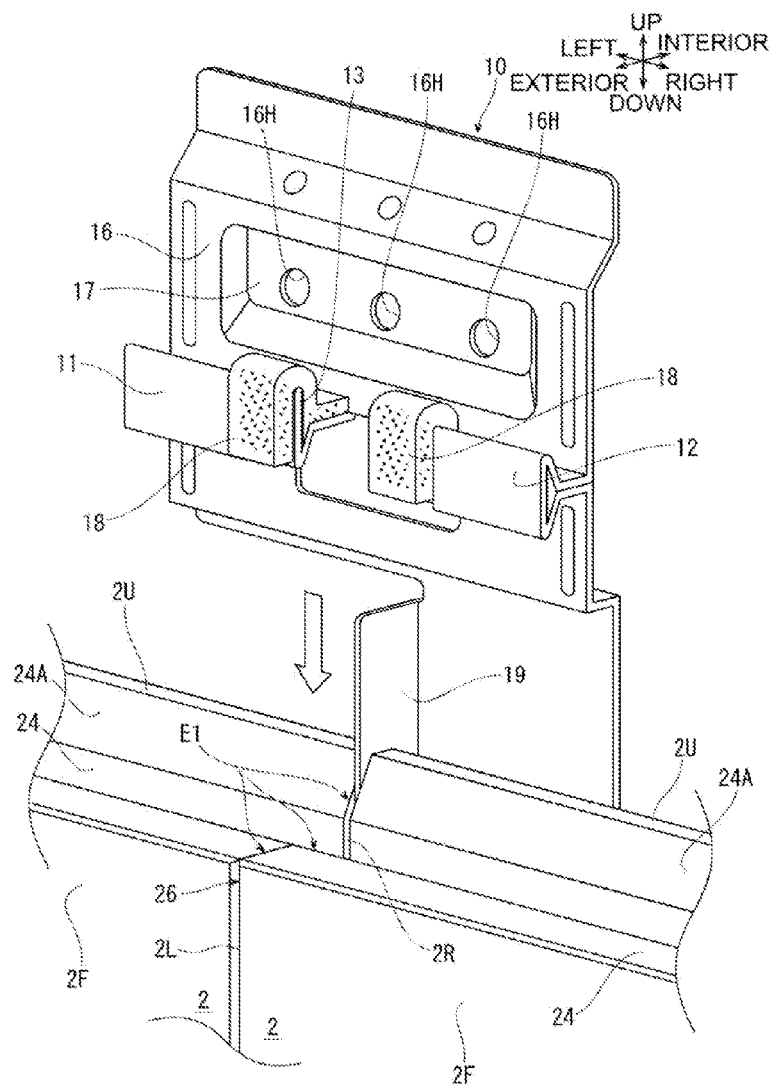
FIG. 16 is a partial perspective view illustrating the way how the securing member and the facade boards are positioned with respect to one another according to the first embodiment.

As illustrated in FIG. 12 and FIG. 16, a right part of the lower end portion of the base portion 16 protrudes downward. At the left edge of the protruding portion, the lateral-displacement stopper portion 19 is disposed. The lateral-displacement stopper portion 19 is a substantially rectangular piece that protrudes toward the exterior and extends vertically. The lateral-displacement stopper portion 19 is provided to prevent the facade board 2 attached thereto from being laterally displaced.

An attachment recess 17 is formed at a vertically middle portion of the base portion 16 so as to be set back toward the interior. The attachment recess 17 is laterally long. Three attachment holes 16H are formed in the bottom portion of the attachment recess 17 so as to be laterally aligned. As illustrated in FIG. 9 and other drawings, each attachment hole 16H allows a setscrew 10B to be inserted therethrough. As illustrated in FIG. 12, the lateral-displacement stopper portion 19 is positioned to the right of the middle attachment hole 16H.

As illustrated in FIG. 12 to FIG. 16, the first locking portion 11, the second locking portion 12, the first sealant-holding portion 13, and the second sealant-holding portion 14 are located below the attachment recess 17 in the base portion 16 and protrude toward the exterior.

As illustrated in FIG. 12, the first locking portion 11, the second locking portion 12, the first sealant-holding portion 13, and the second sealant-holding portion 14 are laterally arranged. The first sealant-holding portion 13 is located to the left of the middle attachment hole 16H. The first locking portion 11 is located to the left of the first sealant-holding portion 13. The second sealant-holding portion 14 is located to the right of the middle attachment hole 16H and the lateral-displacement stopper portion 19. The second locking portion 12 is located to the right of the second sealant-holding portion 14.

Figure 13:
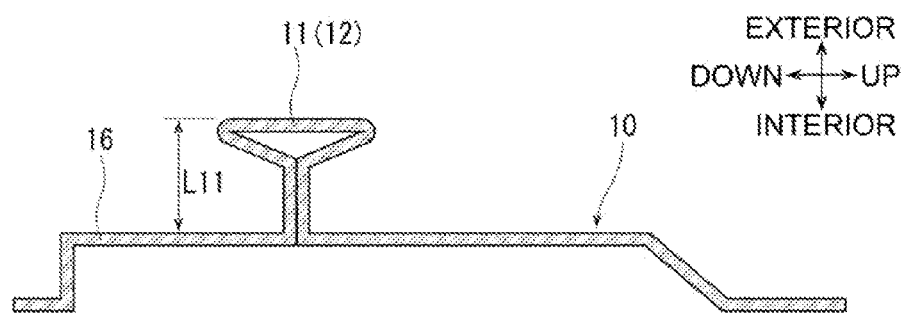
FIG. 13 is a cross-sectional view of the securing member taken along the line XIII-XIII of FIG. 12.

As illustrated in FIG. 13 and FIG. 16, the first locking portion 11 has such a shape that, when viewed sideways, includes a portion horizontally extending toward the exterior from the base portion 16 and an isosceles-triangular portion having a vertex connected to the top end of the horizontally extending portion and a base extending vertically.

Although not illustrated, the cross-sectional shape of the second locking portion 12 is the same as the cross-sectional shape of the first locking portion 11 illustrated in FIG. 13.

Figure 14:
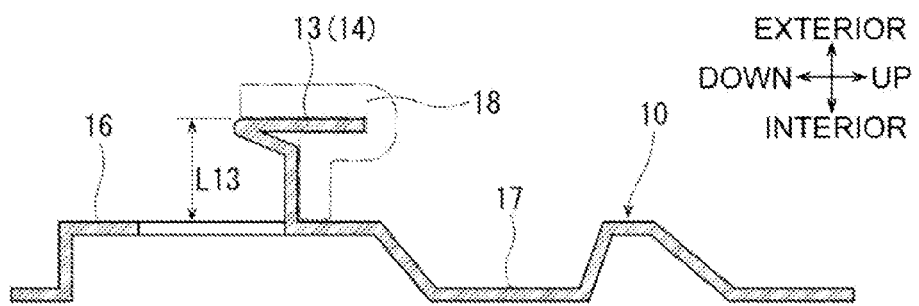
FIG. 14 is a cross-sectional view of the securing member taken along the line XIV-XIV of FIG. 12.
Figure 15:
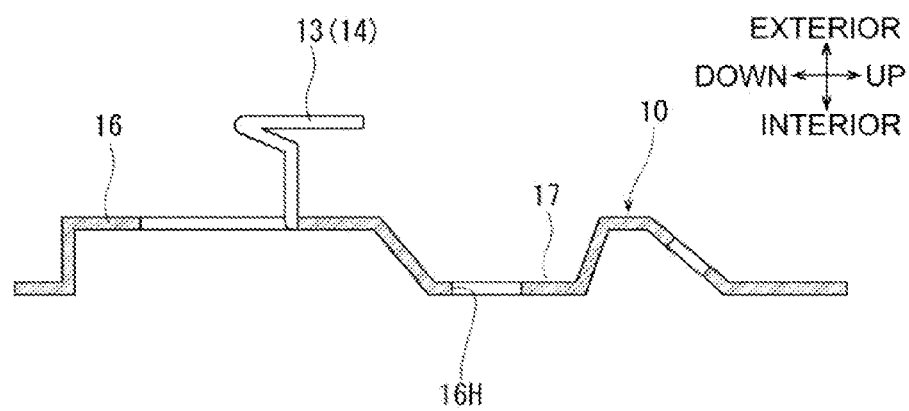
FIG. 15 is a cross-sectional view of the securing member taken along the line XV-XV of FIG. 12.

As illustrated in FIG. 14 and FIG. 16, the first sealant-holding portion 13 has a shape that, when viewed sideways, horizontally extends toward the exterior from the base portion 16, is bent obliquely downward, and is then bent upward so as to extend substantially vertically.

Although not illustrated, the cross-sectional shape of the second sealant-holding portion 14 is the same as the cross-sectional shape of the first sealant-holding portion 13 illustrated in FIG. 14.

As illustrated in FIG. 13, FIG. 14, and FIG. 16, each of the first sealant-holding portion 13 and the second sealant-holding portion 14 holds a sealant 18. While covering the first sealant-holding portion 13 or the second sealant-holding portion 14 from the exterior side, the sealant 18 extends upward, then extends downward along the first sealant-holding portion 13 or the second sealant-holding portion 14, and then extends toward the interior. In this embodiment, the sealant 18 is a small piece made of ethylene propylene diene monomer rubber (EPDM) foam. The material of the sealant 18 is not limited to the above-described structure and may be appropriately selected from other compression deformable materials. The sealant is not indispensable to the exterior structure of the invention. The sealant 18, the first sealant-holding portion 13, and the second sealant-holding portion 14 according to the embodiment may be omitted.

As illustrated in FIG. 13, the length by which the first locking portion 11 protrudes beyond the base portion 16 toward the exterior is defined as L11. The length by which the second locking portion 12 protrudes beyond the base portion 16 toward the exterior is equal to the length L11. As illustrated in FIG. 14, the length by which the first sealant-holding portion 13 protrudes beyond the base portion 16 toward the exterior is defined as L13. The length by which the second sealant-holding portion 14 protrudes beyond the base portion 16 toward the exterior is equal to the length L13. The length L13 is set to be smaller than the length L11 in consideration of the thickness that the sealant 18 has after being subjected to compressive deformation.

Figure 2:
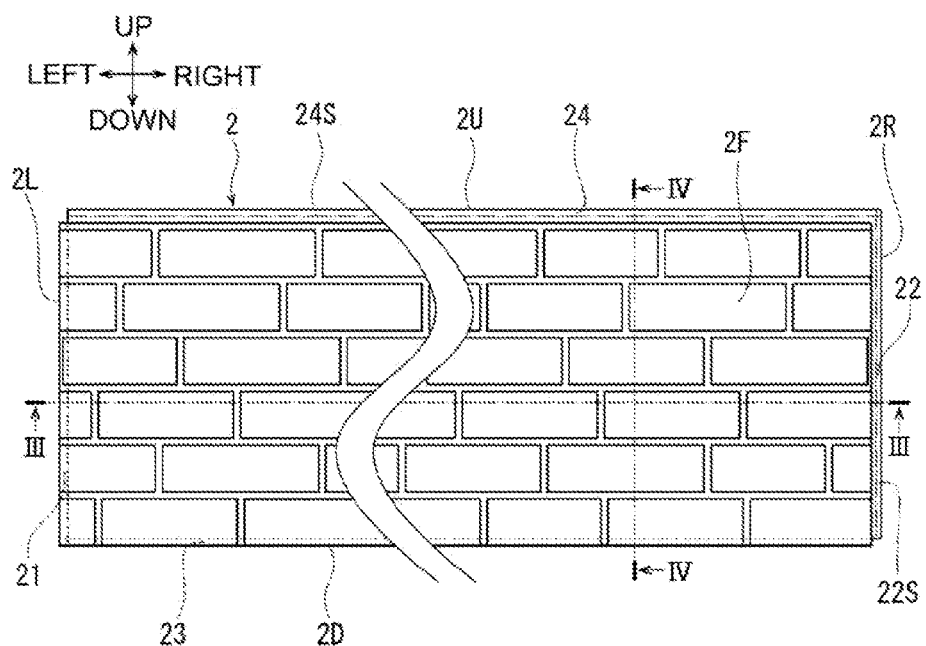
FIG. 2 is a front view of a facade board according to the first embodiment.

As illustrated in FIG. 1, FIG. 2, FIG. 8, and other drawings, each facade board 2 is a quadrilateral board, more specifically, a substantially rectangular board long in the lateral direction. In this embodiment, the facade boards 2 are made of ceramic containing cement. The material of the facade boards 2 is not limited to the above example and may be appropriately selected from materials such as metal-based, wooden-based, or resin-based materials.

As illustrated in FIG. 1 and FIG. 6 to FIG. 11, in the state of being adjacent to one another in the horizontal and vertical directions, the facade boards 2 are disposed on the exterior side of the building structure 8, further outwardly than the insulating member 7, the waterproof sheet 6, the top portions 57A of the brackets 57, the lateral support elements 53, the vertical support elements 50, the lower-edge support element 55, and the securing members 10 so as to cover these components. Firstly, the configuration of the facade boards 2 is described. Then, the configuration in which the facade boards 2 are supported by the securing members 10 and the support elements 5 is described in detail.

Each facade board 2 is a board-shaped member illustrated in FIG. 2 to FIG. 5. A front surface 2F of the facade board 2 is a facing having a pattern such as a brick pattern, as illustrated in FIG. 2. Each facade board 2 has a front-side lateral joint portion 21 at a left edge portion 2L of the facade board 2. The left edge portion 2L is an example of "a horizontal edge portion of each facade board". Each facade board 2 has a back-side lateral joint portion 22 at a right edge portion 2R of the facade board 2. The right edge portion 2R is an example of "another horizontal edge portion of each facade board". Each facade board 2 has a front-side vertical joint portion 23 at a lower edge portion 2D of the facade board 2. Each facade board 2 has a back-side vertical joint portion 24 at an upper edge portion 2U of the facade board 2.

Figure 3:
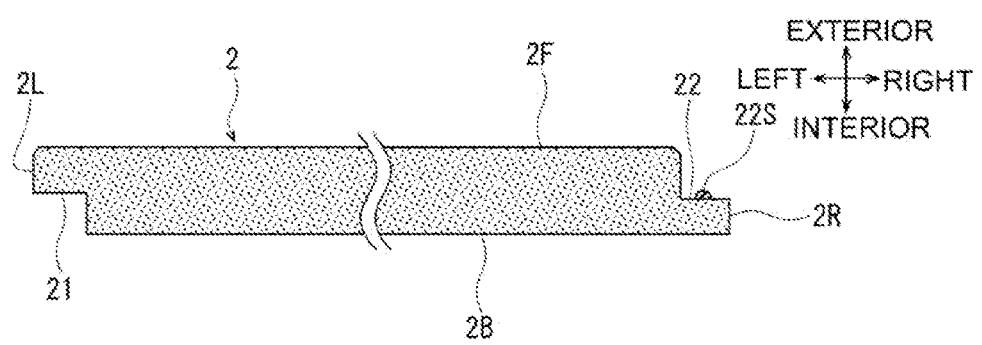
FIG. 3 is a partial cross-sectional view of the facade board taken along the line III-III of FIG. 2.
Figure 5:
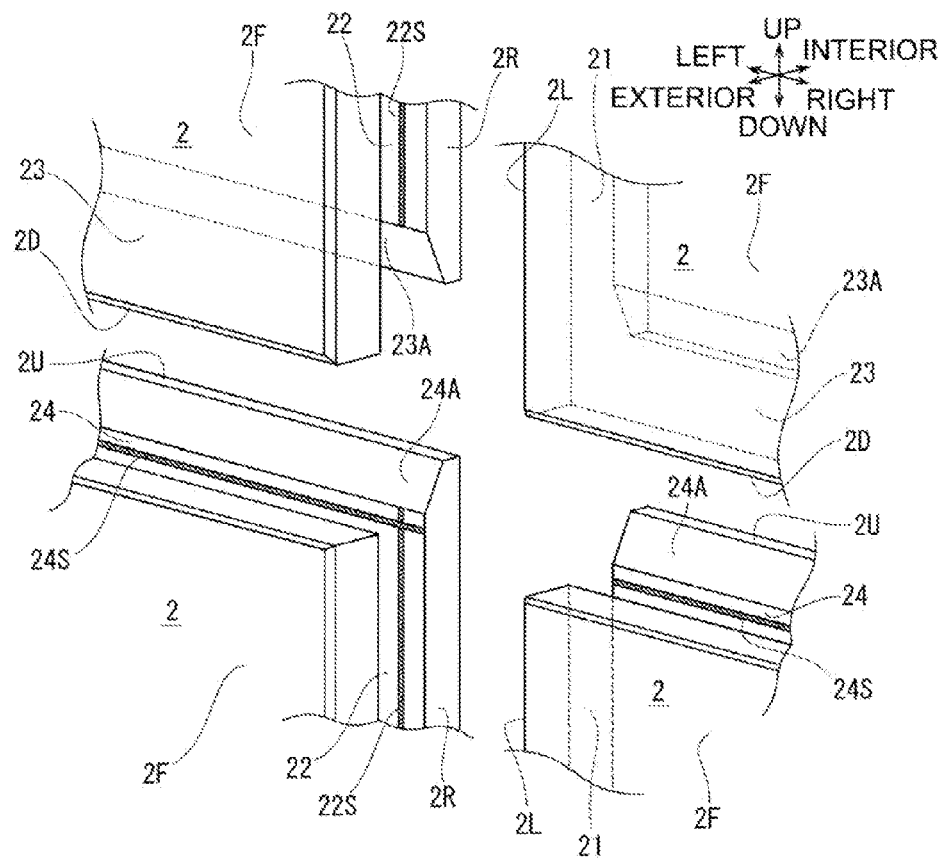
FIG. 5 is a partial perspective view of a joint structure between adjacent facade boards according to the first embodiment.

As illustrated in FIG. 3 and FIG. 5, the front-side lateral joint portion 21 is set back stepwise from a back surface 2B of the facade board 2 toward the front surface 2F of the facade board 2 and extends vertically, that is, along the left edge portion 2L.

The back-side lateral joint portion 22 is set back stepwise from the front surface 2F of the facade board 2 toward the back surface 2B of the facade board 2 and extends vertically, that is, along the right edge portion 2R. A caulking member 22S is disposed on a flat surface of the back-side lateral joint portion 22 facing toward the exterior. The caulking member 22S is linearly disposed along the back-side lateral joint portion 22. The caulking member is not indispensable to the exterior structure of the invention. The caulking member 22S according to the embodiment may be omitted.

Figure 4:
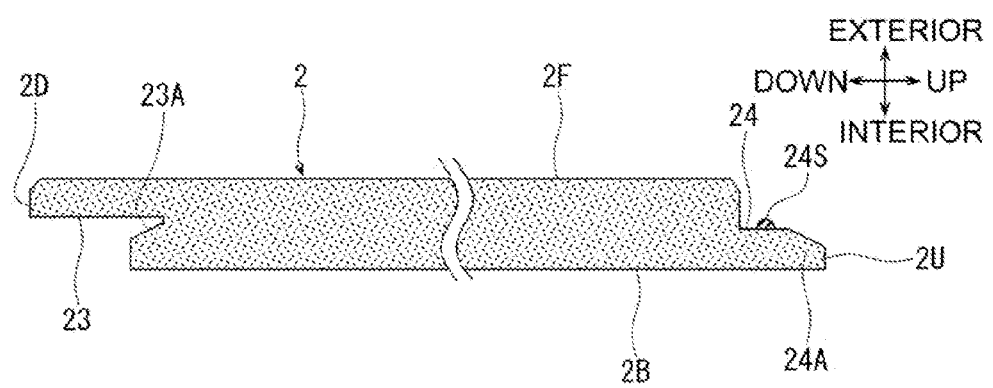
FIG. 4 is a partial cross-sectional view of the facade board taken along the line IV-IV of FIG. 2.

As illustrated in FIG. 4 and FIG. 5, the front-side vertical joint portion 23 is set back stepwise from the back surface 2B of the facade board 2 toward the front surface 2F of the facade board 2 and extends laterally, that is, along the lower edge portion 2D. The front-side vertical joint portion 23 has a locking recess 23A that is recessed upward in a substantially tapering manner.

The back-side vertical joint portion 24 is set back stepwise from the front surface 2F of the facade board 2 toward the back surface 2B of the facade board 2 and extends laterally, that is, along the upper edge portion 2U. A caulking member 24S is disposed on a flat surface of the back-side vertical joint portion 24 facing toward the exterior. The caulking member 24S is linearly disposed along the back-side vertical joint portion 24. The caulking member is not indispensable to the exterior structure of the invention. The caulking member 24S according to the embodiment may be omitted. The back-side vertical joint portion 24 has a locking protrusion 24A that protrudes upward in a substantially tapering manner from a portion above the caulking member 24S.

As illustrated in FIG. 8 to FIG. 11 and FIG. 16, a lateral joint 26 is formed between horizontally adjacent facade boards 2 by superposing the front-side lateral joint portion 21 of one facade board 2 and the back-side lateral joint portion 22 of the other facade board 2. As illustrated in FIG. 8, FIG. 17, FIG. 18, and FIG. 19, a vertical joint 25 is formed between vertically adjacent facade boards 2 by superposing the front-side vertical joint portion 23 of one facade board 2 and the back-side vertical joint portion 24 of the other facade board 2. Specifically, each of the facade boards 2 is a so-called "four-side shiplap structure" board including a front-side lateral joint portion 21, a back-side lateral joint portion 22, a front-side vertical joint portion 23, and a back-side vertical joint portion 24. The lateral joint 26 is formed by superposing the front-side lateral joint portion 21 and the back-side lateral joint portion 22 one on the other and the vertical joint 25 is formed by superposing the front-side vertical joint portion 23 and the back-side vertical joint portion 24 one on the other. As illustrated in FIG. 8, a vertical dimension L25 of the vertical joint 25 is greater than a horizontal dimension L26 of the lateral joint 26.

The facade boards 2 having the above-described configuration are supported by the securing members 10 and the support elements 5 in the manner described below.

As illustrated in FIG. 1, FIG. 6, and FIG. 7, firstly, multiple facade boards 2 in the state of being laterally adjacent to one another are attached to the wall surface 8F at the lowermost position. At this time, as illustrated in FIG. 7, the lower end portions of the lower-edge support elements 55 are fitted into the locking recesses 23A of the front-side vertical joint portions 23 from below, so that the lower edge portions 2D of the facade boards 2 are supported by the support elements 5.

Subsequently, as illustrated in FIG. 16, the lateral-displacement stopper portion 19 of each securing member 10 is inserted into the lateral joint 26 between the laterally adjacent facade boards 2 from their upper edge portions 2U and their back surfaces 2B. Then, as illustrated in FIG. 9 to FIG. 11, the securing member 10 is moved downward and fixed to the vertical support element 50 using the setscrew 10B. Thus, the first locking portion 11 and the second locking portion 12 of the securing member 10 are locked onto the locking protrusions 24A of the back-side vertical joint portions 24 of the facade boards 2 from above.

Figure 17:
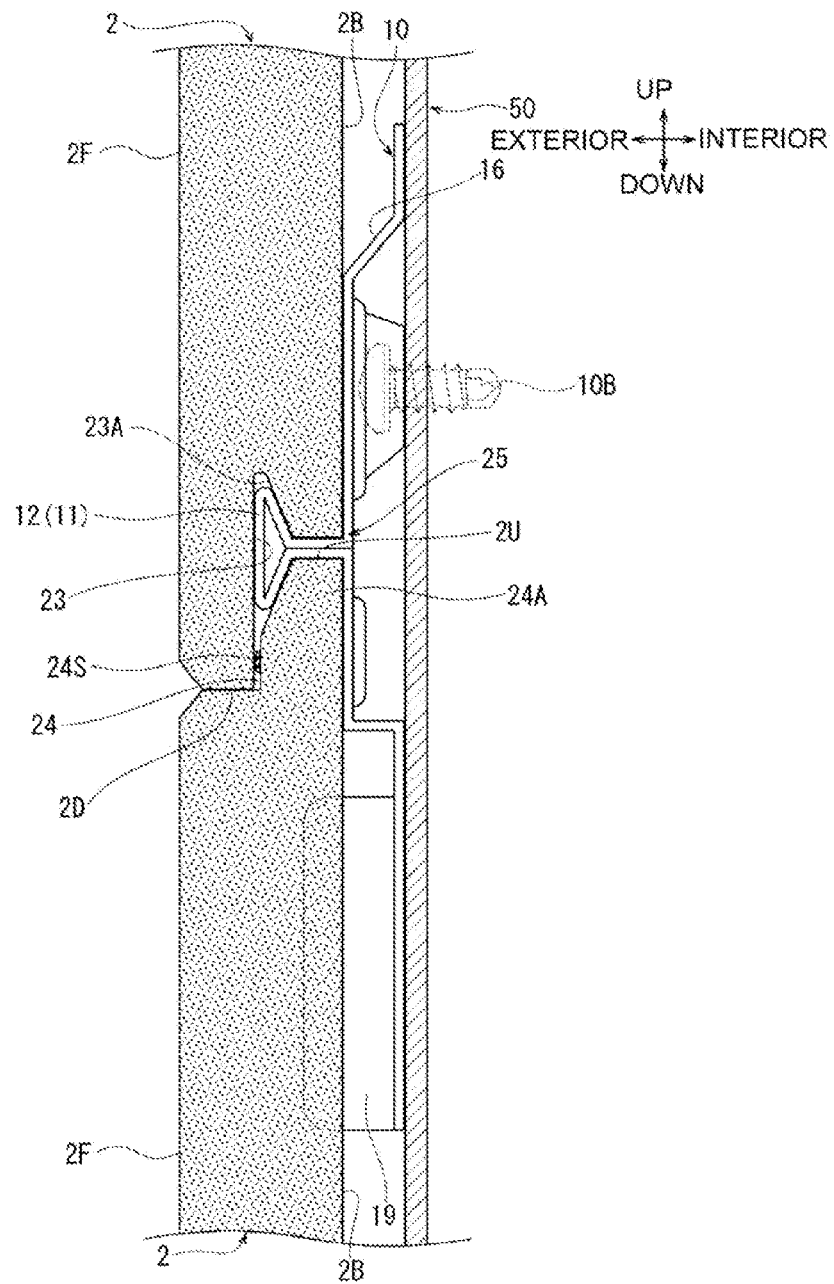
FIG. 17 is a partial cross-sectional view of the attachment structure taken along the line XVII-XVII of FIG. 11.
Figure 18:
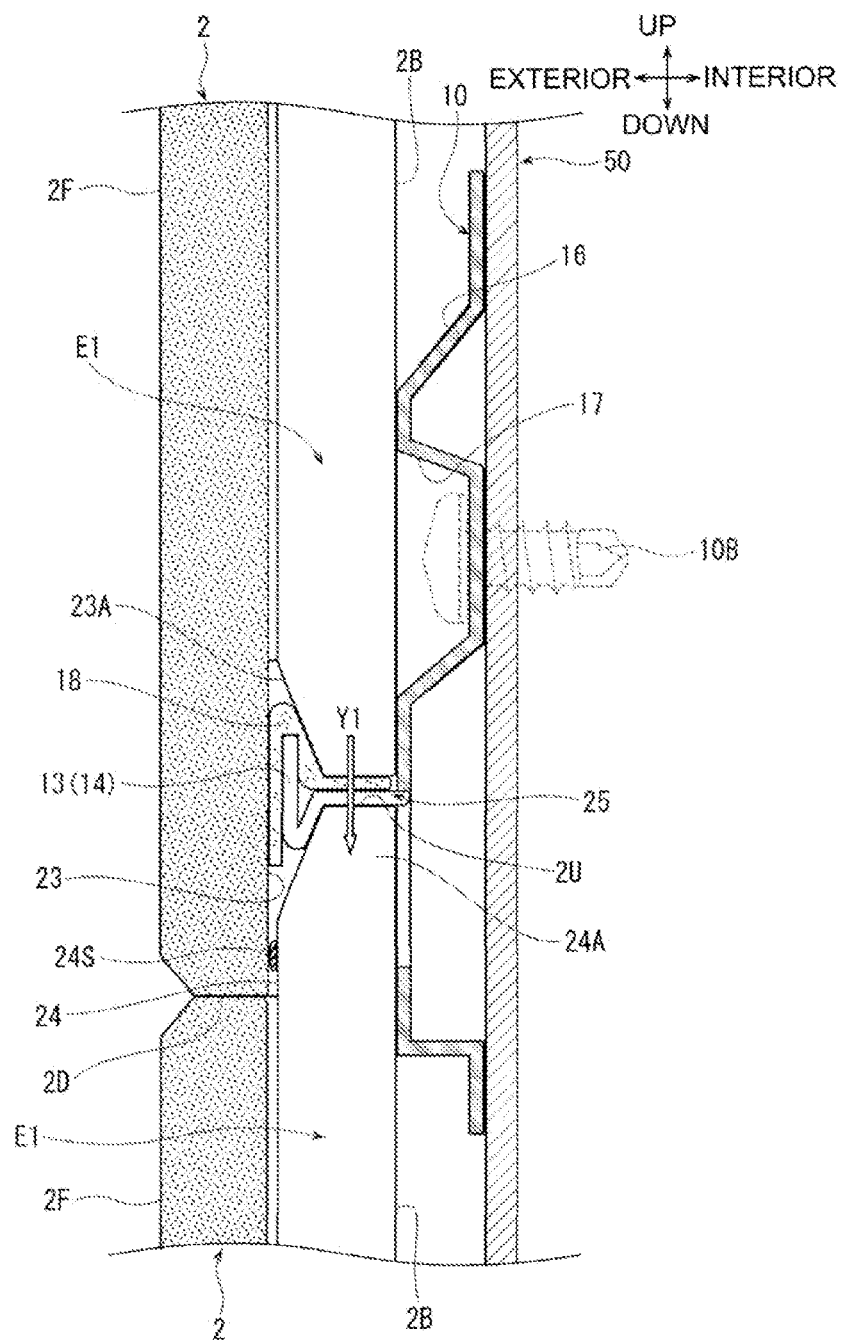
FIG. 18 is a partial cross-sectional view of the attachment structure taken along the line XVIII-XVIII of FIG. 11.

Subsequently, as illustrated in FIG. 17 and FIG. 18, multiple facade boards 2 in the state of being laterally adjacent to one another are attached to the wall surface 8F at a position above the facade boards 2 attached at the lowermost position. At this time, as illustrated in FIG. 17, the first locking portion 11 and the second locking portion 12 of each securing member 10 are fitted into the locking recesses 23A of the front-side vertical joint portions 23 from below, so that the lower edge portions 2D of the facade boards 2 are supported by the support elements 5. Here, as illustrated in FIG. 18, the sealants 18 supported by the first sealant-holding portion 13 and the second sealant-holding portion 14 of the securing member 10 come into contact with the locking recesses 23A of the front-side vertical joint portions 23 of the facade boards 2. Although not illustrated, the upper edge portions 2U of these facade boards 2 are supported by the support elements 5 using other securing members 10 in the above-described manner. By performing such operations also on other facade boards 2, the facade boards 2 are attached to the securing members 10 and the support elements 5 in the state of being adjacent to one another in the horizontal and vertical directions and cover the entirety of the wall surface 8F.

Another securing member can be additionally disposed between any two laterally adjacent securing members 10 illustrated in FIG. 8 so as to more firmly support the vertical joint 25 between the vertically adjacent facade boards 2.

In this embodiment, as illustrated in FIG. 7 and FIG. 10, a ventilation gap S1 is securely provided between the waterproof sheet 6 on the insulating member 7 and the back surface 2B of each facade board 2. The ventilation gap S1 is appropriately adjusted in consideration of, for example, the conditions under which the exterior wall 9 is installed. For example, the ventilation gap S1 is preferably set so as to be 7 mm or greater in terms of reliable permeability. Depending on the environments or standards of countries, the ventilation gap S1 may be set at approximately 40 mm. In this embodiment, the ventilation gap S1 is set at 15 mm or greater. The ventilation gap is not indispensable to the exterior structure according to the invention and the ventilation gap S1 according to the embodiment may be omitted.

Figure 19:
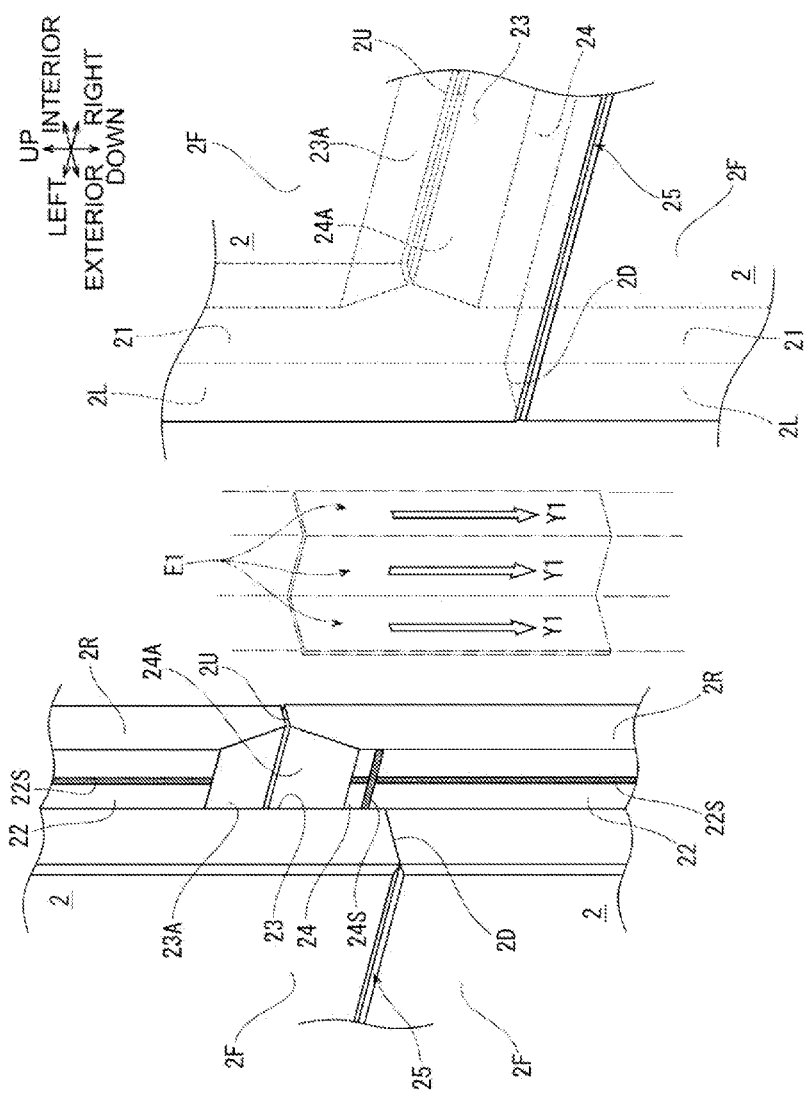
FIG. 19 is a partial perspective view illustrating joint areas formed by the lateral joints according to the first embodiment.

As illustrated in FIG. 8 to FIG. 11, FIG. 16, FIG. 18, and FIG. 19, in at least four facade boards 2 adjacent to one another in the horizontal and vertical directions, the lateral joints 26 form joint areas E1 substantially linearly continuous in the vertical direction. The joint areas E1 are extremely narrow gaps formed as a result of the front-side lateral joint portion 21 and the back-side lateral joint portion 22 coming into contact with each other. As illustrated in FIG. 11, the joint areas E1 are bent in a substantially crank form when viewed in the vertical direction. In FIG. 19, the thickness of the joint areas E1 is illustrated in an exaggerated manner.

As illustrated in FIG. 9, FIG. 11, and other drawings, the first locking portion 11, the first sealant-holding portion 13, and the sealant 18 held by the first sealant-holding portion 13 are disposed to the left of the joint areas E1 while being spaced apart from the joint areas E1. The first locking portion 11 supports the vertical joint 25 between the facade boards 2 located to the left of the joint areas E1.

The second locking portion 12, the second sealant-holding portion 14, the sealant 18 held by the second sealant-holding portion 14 are disposed to the right of the joint areas E1 while being spaced apart from the joint areas E1. The second locking portion 12 supports the vertical joint 25 between the facade boards 2 located to the right of the joint areas E1.

Specifically, the first locking portion 11, the second locking portion 12, the first sealant-holding portion 13, the second sealant-holding portion 14, and the sealants 18 supported by the first sealant-holding portion 13 and the second sealant-holding portion 14 of the securing member 10 do not cross over the joint areas E1 in the lateral direction.

As illustrated in FIG. 9 to FIG. 11, the vertical support element 50 vertically extends along the joint areas E1 while facing the back surfaces 2B of the facade boards 2.

Operation and Effect

In the exterior structure according to the first embodiment, as illustrated in FIG. 8 and other drawings, each facade board 2 is a so-called "four-side shiplap structure" board, including the front-side lateral joint portion 21, the back-side lateral joint portion 22, the front-side vertical joint portion 23, and the back-side vertical joint portion 24. The lateral joint 26 is formed by superposing the front-side lateral joint portion 21 and the back-side lateral joint portion 22 one on the other and the vertical joint 25 is formed by superposing the front-side vertical joint portion 23 and the back-side vertical joint portion 24 one on the other. Thus, gaps are hindered from being formed between adjacent facade boards 2.

In this exterior structure, as illustrated in FIG. 8, FIG. 11, FIG. 17 to FIG. 19, and other drawings, superposing the front-side lateral joint portion 21 and the back-side lateral joint portion 22 one on the other and superposing the front-side vertical joint portion 23 and the back-side vertical joint portion 24 one on the other enable prevention of rainwater from accessing the back surfaces 2B of the facade boards 2. The caulking members 22S and 24S interposed between superposed joint portions are also capable of preventing rainwater from accessing the back surfaces 2B of the facade boards 2. Thus, this exterior structure hinders rainwater from arriving at the insulating member 7.

In this exterior structure, as illustrated in FIG. 8 to FIG. 11, FIG. 16, FIG. 18, and FIG. 19, in at least four facade boards 2 adjacent to one another in the horizontal and vertical directions, the lateral joints 26 form joint areas E1 substantially linearly continuous in the vertical direction. Thus, in the case where rainwater is to access the back surfaces 2B of the facade boards 2 through the lateral joints 26, the rainwater is discharged downward along the simple joint areas E1 in the manner as indicated by arrow Y1 in FIG. 18 and FIG. 19. In the case where rainwater is to enter the vertical joints 25 from the joint areas E1, the sealants 18 prevent the rainwater from entering the vertical joints 25. Thus, this exterior structure hinders rainwater from arriving at the insulating member 7 and is capable of preventing rainwater from permeating into the facade boards 2. As a result, in this exterior structure, the ventilation gap S1 between the insulating member 7 and the facade boards 2 can be adjusted to an intended size.

Thus, the exterior structure according to the first embodiment is capable of suppressing degradation of the insulating member 7 due to rainwater and suppressing degradation of the external appearance of the exterior wall 9 with a simple structure. In this exterior structure, the ventilation gap S1 is adjustable to an intended size, whereby the structure of the building is prevented from being unnecessarily increased in size. Furthermore, this exterior structure can dispense with laying of the waterproof sheet 6 over the surface of the insulating member 7.

In this exterior structure, as illustrated in FIG. 9 to FIG. 11, FIG. 17, and FIG. 18, the facade boards 2 can be securely attached to the support elements 5 using the securing members 10 illustrated in FIG. 12 to FIG. 16. In this exterior structure, the securing members 10 are not exposed to the outside through the front surfaces 2F of the facade boards 2, whereby degradation of the external appearance of the exterior wall 9 can be suppressed.

Furthermore, in this exterior structure, as illustrated in FIG. 9, FIG. 11, and other drawings, the first locking portion 11 and the second locking portion 12 of each securing member 10 do not cross over the joint areas E1 in the lateral direction. Thus, in this exterior structure, in the case where rainwater is to access the back surfaces 2B of the facade boards 2 through the lateral joint 26, the rainwater is discharged downward along the joint areas E1 in the manner as indicated by arrow Y1 in FIG. 18 and FIG. 19 without the downward flow of the rainwater being stopped by the securing members 10 or without stagnating at the securing members 10. This configuration thus hinders rainwater from arriving at the insulating member 7 and is capable of preventing rainwater from permeating into the facade boards 2. The rainwater that has flowed downward is discharged to the outside through the draining board 6A.

In addition, in this exterior structure, as illustrated in FIG. 9 to FIG. 11, the vertical support elements 50 vertically extend along the joint areas E1 while facing the back surfaces 2B of the facade boards 2. Thus, rainwater that is to access the back surfaces 2B of the facade boards 2 through the lateral joints 26 is stopped by the vertical support elements 50 located behind the joint areas E1 and is prevented from permeating into the insulating member 7. The rainwater is discharged downward along the vertical support elements 50 besides the joint areas E1. This configuration thus hinders rainwater from arriving at the insulating member 7 and is capable of preventing rainwater from permeating into the facade boards 2.

Moreover, in this exterior structure, as illustrated in FIG. 8, the vertical dimension L25 of the vertical joints 25 is greater than the horizontal dimension L26 of the lateral joints 26. This exterior structure is thus capable of hindering rainwater from accessing the back surfaces 2B of the facade boards 2 through the vertical joints 25, whereby rainwater is hindered from arriving at the insulating member 7 and prevented from permeating into the facade boards 2.

In this exterior structure, the facade boards 2 are made of an alkaline ceramic material, whereby corrosion of the support elements 5 is prevented even though the support elements 5 are made of metal.

Second Embodiment

Figure 20:
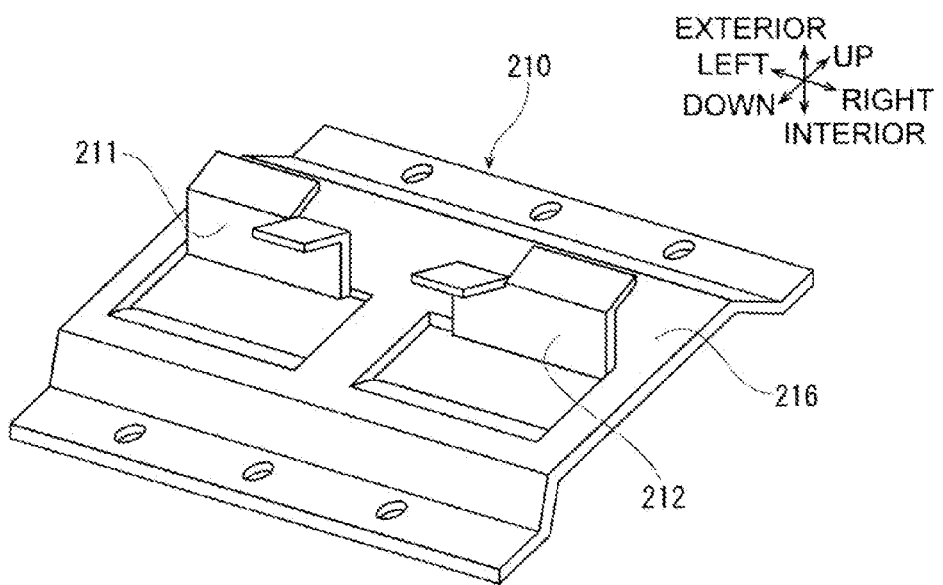
FIG. 20 is a perspective view of a securing member of an exterior structure according to a second embodiment.

As illustrated in FIG. 20, an exterior structure according to a second embodiment includes securing members 210 instead of the securing members 10 in the exterior structure according to the first embodiment. Other components according to the second embodiment are the same as those according to the first embodiment. Thus, the components that are the same as those according to the first embodiment are denoted by the same reference numerals and the description of these components is omitted or simplified.

The material of the securing members 210 and the method for manufacturing the securing members 210 are the same as the material of the securing members 10 and the method for manufacturing the securing members 10 according to the first embodiment. Each securing member 210 includes a base portion 216, a first locking portion 211, and a second locking portion 212. The securing member 210, however, does not include elements corresponding to the first sealant-holding portion 13, the second sealant-holding portion 14, and the lateral-displacement stopper portion 19 of the securing member 10 according to the first embodiment. The securing member 210 does not hold elements corresponding to the sealants 18 according to the first embodiment.

The first locking portion 211 is a portion formed by bending a left portion of the substantially rectangular base portion 216 and protrudes toward the exterior. The first locking portion 211 has a small piece bent upward and a small piece bent downward at its top end portion.

The second locking portion 212 is a portion formed by bending a right portion of the substantially rectangular base portion 216 and protrudes toward the exterior. The second locking portion 212 has a small piece bent upward and a small piece bent downward at its top end portion.

Specifically, the first locking portion 211 and the second locking portion 212 are laterally spaced apart from each other and have a space therebetween.

Although not illustrated, the securing member 210 is attached to the vertical support element 50 as in the case of the securing member 10 according to the first embodiment. The first locking portion 211 is disposed to the left of the joint area E1 while being spaced apart from the joint areas E1, as in the case of the first locking portion 11 of the securing member 10 according to the first embodiment. The first locking portion 211 supports the vertical joint 25 between the facade boards 2 located to the left of the joint areas E1.

Although not illustrated, the second locking portion 212 is disposed to the right of the joint areas E1 while being spaced apart from the joint areas E1, as in the case of the second locking portion 12 of the securing member 10 according to the first embodiment. The second locking portion 212 supports the vertical joint 25 between the facade boards 2 located to the right of the joint areas E1.

Specifically, the first locking portion 211 and the second locking portion 212 of the securing member 210 do not cross over the joint areas E1 in the lateral direction. Thus, in the case where rainwater is to access the back surfaces 2B of the facade boards 2 through the lateral joint 26, the rainwater is discharged downward along the joint areas E1 without being stopped by the securing members 210 or without stagnating at the securing members 210.

Thus, as in the case of the exterior structure according to the first embodiment, the exterior structure according to the second embodiment is capable of suppressing degradation of the insulating member 7 due to rainwater and degradation of the external appearance of the exterior wall 9 with a simple structure. In addition, the securing members 210 in this exterior structure are further simplified than the securing members 10 according to the first embodiment. Thus, the use of the securing members 210 enables reduction of product costs.

The securing member 210 according to the second embodiment does not include an element corresponding to the lateral-displacement stopper portion 19. However, when necessary, a plate-shaped lateral-displacement stopper may be disposed between adjacent facade boards 2, separately from the securing member 210.

Third Embodiment

Figure 21:
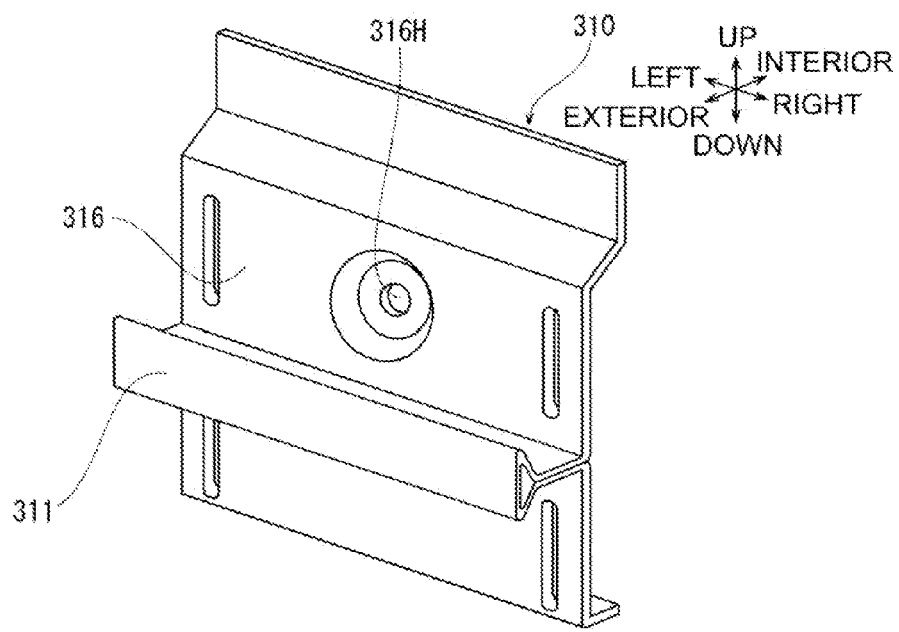
FIG. 21 is a perspective view of a securing member of an exterior structure according to a third embodiment.
Figure 22:
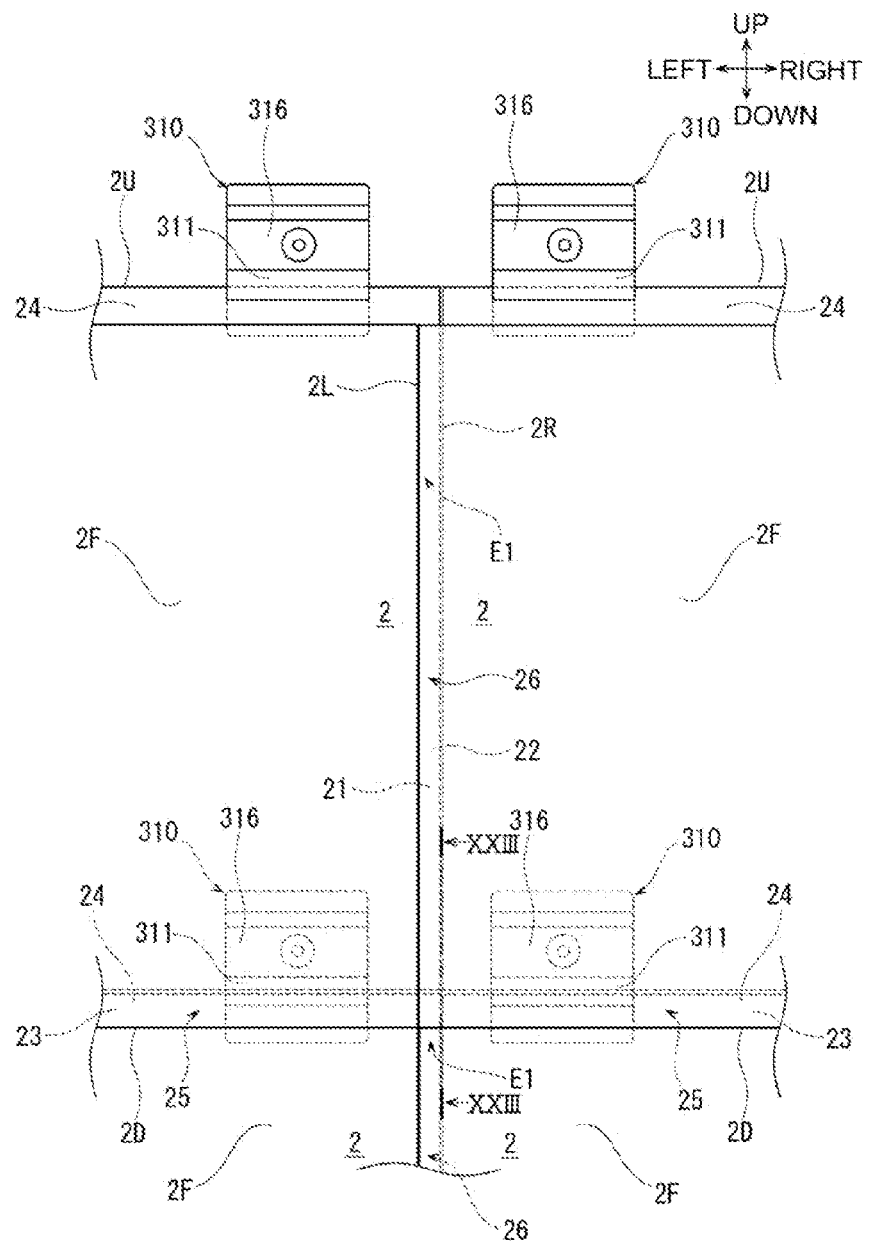
FIG. 22 is a front view of the relative positional relation between four facade boards and securing members according to the third embodiment.
Figure 23:
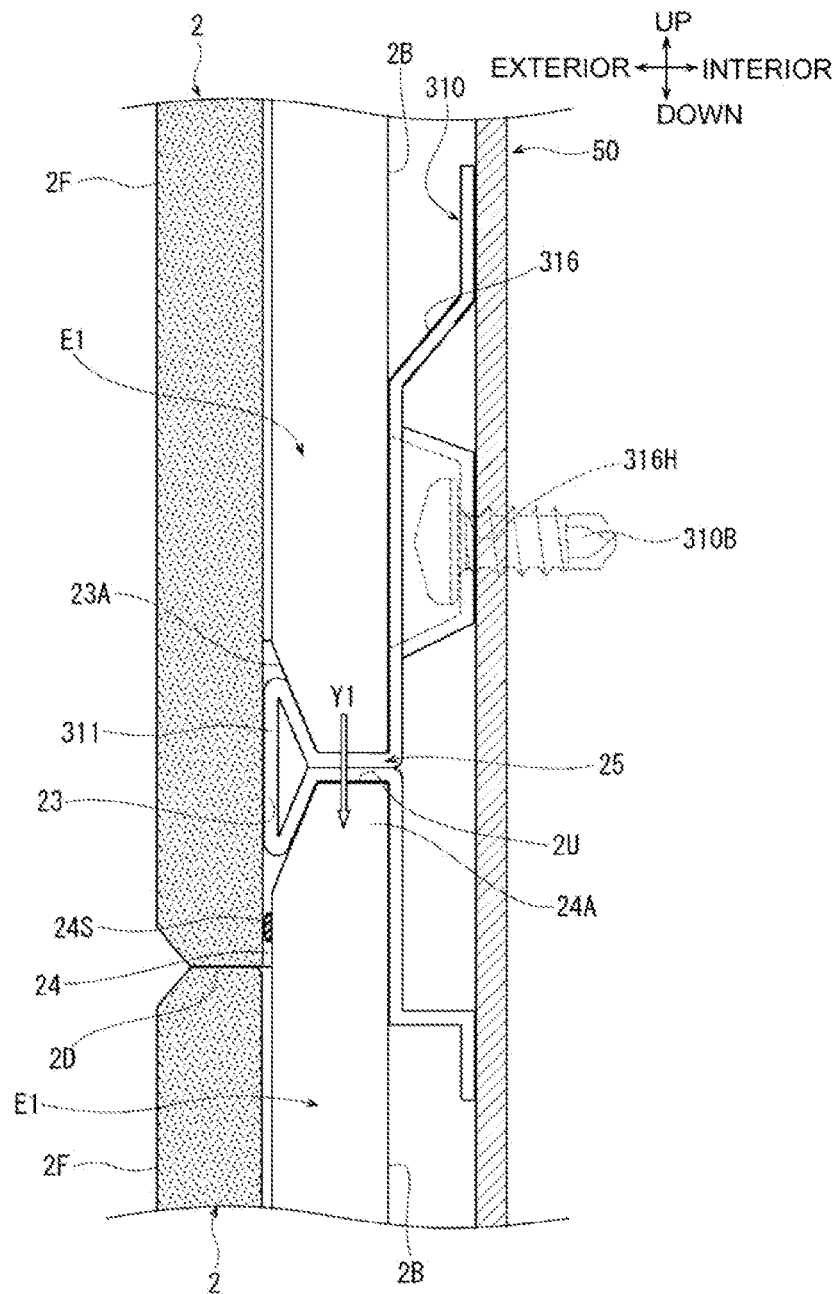
FIG. 23 is a partial cross-sectional view of the facade boards and the securing member taken along the line XXIII-XXIII of FIG. 22.

As illustrated in FIG. 21 to FIG. 23, an exterior structure according to a third embodiment includes securing members 310 instead of the securing members 10 in the exterior structure according to the first embodiment. Other components according to the third embodiment are the same as those according to the first embodiment. Thus, the components that are the same as those according to the first embodiment are denoted by the same reference numerals and the description of these components is omitted or simplified.

The material of the securing members 310 or the method for manufacturing the securing members 310 are the same as the material of the securing members 10 and the method for manufacturing the securing members 10 according to the first embodiment. As illustrated in FIG. 21, each securing member 310 includes a base portion 316 and a locking portion 311. The securing member 310, however, does not include elements corresponding to the first sealant-holding portion 13, the second sealant-holding portion 14, and the lateral-displacement stopper portion 19 of the securing member 10 according to the first embodiment. The securing member 310 does not hold elements corresponding to the sealants 18 according to the first embodiment.

The base portion 316 is substantially rectangular and has an attachment hole 316H formed through at its center portion. A setscrew 310B, serving as a fastener and illustrated in FIG. 23, is inserted into the attachment hole 316H.

The locking portion 311 is located below the attachment hole 316H of the base portion 316 and protrudes toward the exterior. The locking portion 311 laterally extends from the left end to the right end of the base portion 316. As illustrated in FIG. 23, the locking portion 311 has such a shape that, when viewed sideways, includes a portion horizontally extending toward the exterior from the base portion 316 and an isosceles-triangular portion having a vertex connected to the top end of the horizontally extending portion and a base extending vertically.

The securing member 310 is attached to the vertical support element 50 using the setscrew 310B. Here, as illustrated in FIG. 22 and FIG. 23, one securing member 310 is disposed to the left of the joint areas E1 while being spaced apart from the joint areas E1 and the locking portion 311 of the securing member 310 supports the vertical joint 25 between the facade boards 2 located to the left of the joint areas E1. In addition, another securing member 310 is disposed to the right of the joint areas E1 while being spaced apart from the joint areas E1 and the locking portion 311 of the securing member 310 supports the vertical joint 25 between the facade boards 2 located to the right of the joint areas E1.

Specifically, the securing member 310 disposed to the left of the joint areas E1 while being spaced apart from the joint areas E1 and the securing member 310 disposed to the right of the joint areas E1 while being spaced apart from the joint areas E1 do not cross over the joint areas E1 in the lateral direction. Thus, in the case where rainwater is to access the back surfaces 2B of the facade boards 2 through the lateral joints 26, the rainwater is discharged downward along the joint areas E1 in the manner indicated by arrow Y1 in FIG. 23 without the downward flow of the rainwater being stopped by the securing members 310 or without stagnating at the securing members 310.

Thus, as in the case of the exterior structures according to the first and second embodiments, the exterior structure according to the third embodiment is capable of suppressing degradation of the insulating member 7 due to rainwater and degradation of the external appearance of the exterior wall 9 with a simple structure. In addition, the securing members 310 in this exterior structure are further simplified than the securing members 10 according to the first embodiment. Thus, the use of the securing members 310 enables reduction of product costs.

The third embodiment may also have, when necessary, a plate-shaped lateral-displacement stopper disposed between adjacent facade boards 2.

Fourth Embodiment

Figure 24:
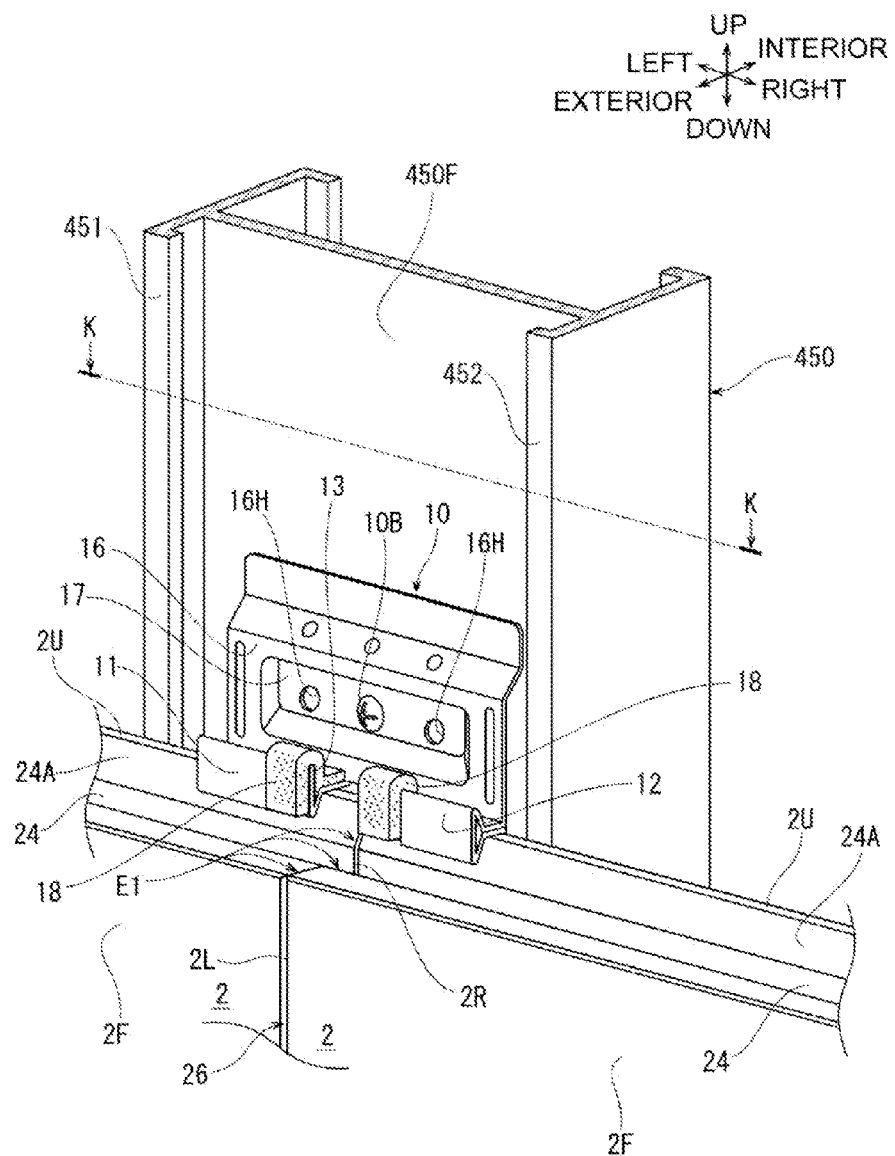
FIG. 24 is a partial perspective view mainly illustrating first and second protrusions of a vertical support element of an exterior structure according to a fourth embodiment.
Figure 25:
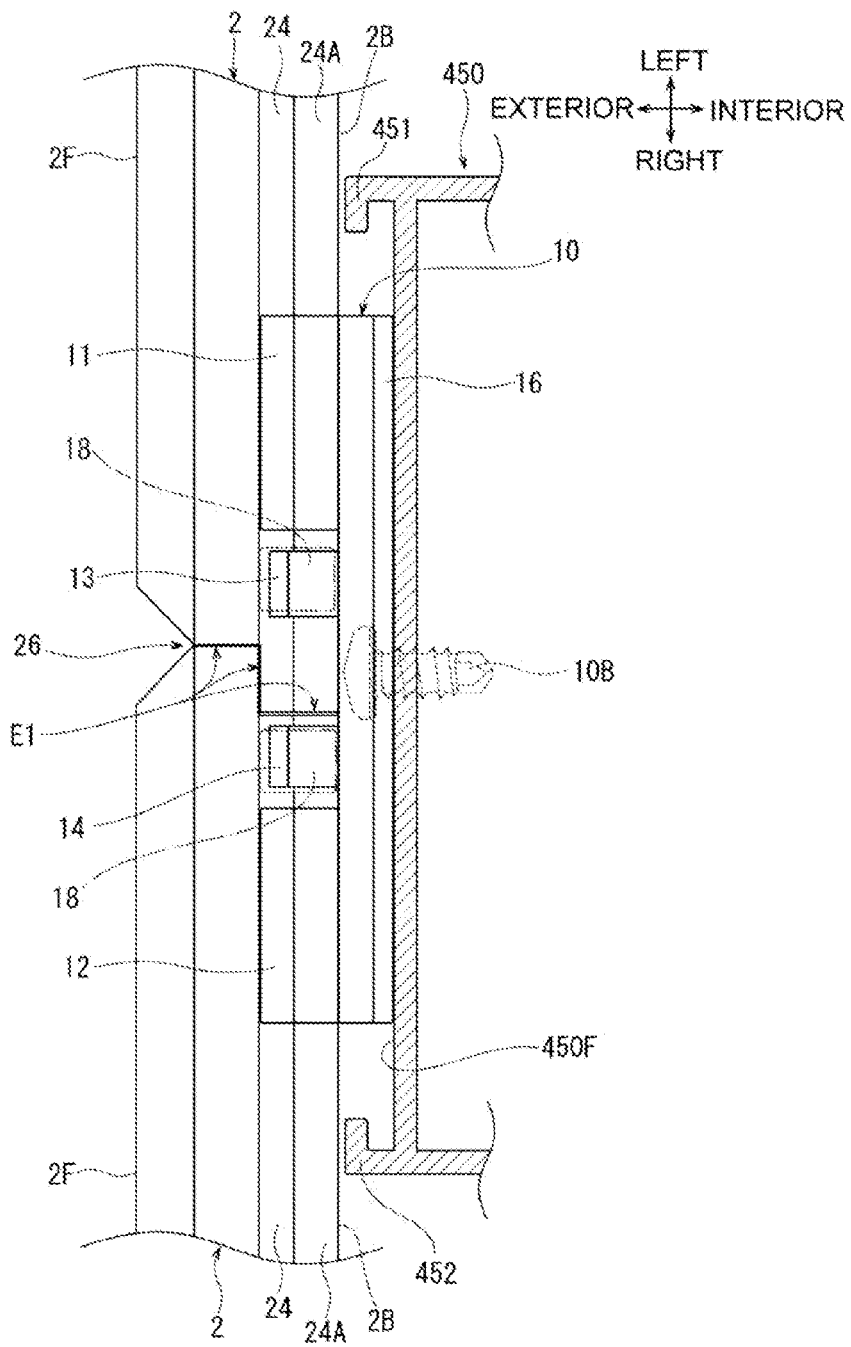
FIG. 25 is a partial cross-sectional view mainly illustrating the first and second protrusions of the vertical support element according to the fourth embodiment.

As illustrated in FIG. 24 and FIG. 25, an exterior structure according to the fourth embodiment includes vertical support elements 450 instead of the vertical support elements 50 in the exterior structure according to the first embodiment. Other components according to the fourth embodiment are the same as those according to the first embodiment. Thus, the components that are the same as those according to the first embodiment are denoted by the same reference numerals and the description of these components is omitted or simplified.

The vertical support elements 450 have a cross-sectional shape different from that of the vertical support elements 50 according to the first embodiment. Each vertical support element 450 has a first protrusion 451 and a second protrusion 452. As in the case of the vertical support elements 50 according to the first embodiment, the vertical support elements 450 may be attached to the lateral support elements 53 using setscrews, not illustrated. As in the case of the vertical support elements 50 according to the first embodiment, the securing members 10 are attached, using the setscrews 10B, to attachment surfaces 450F of the vertical support elements 450 facing toward the exterior.

The first protrusion 451 is disposed adjacent to the left edge of the attachment surface 450F. The first protrusion 451 is disposed to the left of the joint areas E1 while being spaced apart from the joint areas E1. The first protrusion 451 protrudes toward the back surfaces 2B of the facade boards 2 and extends vertically. The first protrusion 451 is disposed also to the left of the securing member 10 while being spaced apart from the securing member 10. The end portion of the first protrusion 451 is bent rightward at a position adjacent to the back surfaces 2B of the facade boards 2.

The second protrusion 452 is disposed adjacent to the right edge of the attachment surface 450F. The second protrusion 452 is disposed to the right of the joint areas E1 while being spaced apart from the joint areas E1. The second protrusion 452 protrudes toward the back surfaces 2B of the facade boards 2 and extends vertically. The second protrusion 452 is disposed also to the right of the securing member 10 while being spaced apart from the securing member 10. The end portion of the second protrusion 452 is bent leftward at a position adjacent to the back surfaces 2B of the facade boards 2.

The attachment surface 450F of the vertical support element 450 vertically extends along the joint areas E1 while facing the back surfaces 2B of the facade boards 2. Thus, rainwater that is to access the back surfaces 2B of the facade boards 2 through the lateral joints 26 is stopped by the attachment surface 450F located behind the joint areas E1 and is prevented from permeating into the insulating member 7. The rainwater is discharged downward along the attachment surface 450F besides the joint areas E1. At this time, rainwater running along the attachment surfaces 450F is guided downward by the first protrusions 451 and the second protrusions 452 and prevented from spattering leftward or rightward. This configuration thus hinders rainwater from arriving at the insulating member 7 and is capable of preventing rainwater from permeating into the facade boards 2.

As in the case of the exterior structures according to the first to third embodiments, the exterior structure according to the fourth embodiment is capable of suppressing degradation of the insulating member 7 due to rainwater and degradation of the external appearance of the exterior wall 9 with a simple structure.

Thus far, the invention has been described using the first to fourth embodiments. However, the present invention is not limited to the first to fourth embodiments and can naturally be appropriately modified within the scope not departing from the gist of the invention.

What is claimed is:

1. An exterior structure, comprising:
a building structure having an exterior wall of a building;
an insulating member disposed on an exterior side of the building structure;
a plurality of support elements disposed on the exterior side of the building structure;
a plurality of quadrilateral facade boards disposed on the exterior side of the building structure, further outwardly than the insulating member and the support elements, and attached to the support elements so as to be adjacent to each other in a horizontal direction and a vertical direction, the facade boards covering the building structure, the insulating member, and the support elements;
a front-side lateral joint portion disposed at a horizontal edge portion of each facade board, the front-side lateral joint portion being set back from a back surface of the facade board toward a front surface of the facade board and extending in the vertical direction;
a back-side lateral joint portion disposed at another horizontal edge portion of each facade board, the back-side lateral joint portion being set back from the front surface of the facade board toward the back surface of the facade board and extending in the vertical direction;
a front-side vertical joint portion disposed at a lower edge portion of each facade board, the front-side vertical joint portion being set back from the back surface of the facade board toward the front surface of the facade board and extending in the horizontal direction;
a back-side vertical joint portion disposed at an upper edge portion of each facade board, the back-side vertical joint portion being set back from the front surface of the facade board toward the back surface of the facade board and extending in the horizontal direction;

a lateral joint formed between each horizontally adjacent pair of the facade boards as a result of the front-side lateral joint portion of a first facade board of the horizontally adjacent pair of the facade boards and the back-side lateral joint portion of a second facade board of the horizontally adjacent pair of the facade boards being superposed; and a vertical joint formed between each vertically adjacent pair of the facade boards as a result of the front-side vertical joint portion of a first facade board of the vertically adjacent pair of the facade boards and the back-side vertical joint portion of a second facade board of the vertically adjacent pair of the facade boards being superposed, wherein, in at least four horizontally and vertically adjacent facade boards, the lateral joints form a joint area substantially linearly continuous in the vertical direction.

2. The exterior structure according to claim 1, further comprising:

a securing member disposed on at least one of the support elements, the securing member supporting the vertical joint between the facade boards while being covered with the facade boards.

3. The exterior structure according to claim 2, wherein the securing member includes a first locking portion, disposed on a first horizontal side of the joint area while being spaced apart from the joint area, and a second locking portion, disposed on a second horizontal side while being spaced apart from the joint area, wherein the first locking portion supports the vertical joint between the facade boards disposed on the first horizontal side of the joint area, and wherein the second locking portion supports the vertical joint between the facade boards disposed on the second horizontal side of the joint area.

4. The exterior structure according to claim 1, wherein the support element includes a vertical support element disposed so as to face the back surfaces of the facade boards and so as to vertically extend along the joint area.

5. The exterior structure according to claim 4, wherein the vertical support element includes a vertically extending first protrusion and a vertically extending second protrusion, wherein the first protrusion is disposed on a first horizontal side of the joint area while being spaced apart from the joint area and protrudes toward the facade boards, and wherein the second protrusion is disposed on a second horizontal side of the joint area while being spaced apart from the joint area and protrudes toward the facade boards.

6. The exterior structure according to claim 1, wherein a vertical dimension of the vertical joint is greater than a horizontal dimension of the lateral joint.

7. The exterior structure according to claim 1, wherein the facade board is made of a ceramic material containing cement, and wherein the support element is made of metal.

* * * * *